United States Patent [19]
Ross

[11] Patent Number: 5,666,525
[45] Date of Patent: Sep. 9, 1997

[54] SYSTEM AND METHOD FOR PERFORMING AN EFFICIENT JOIN OPERATION ON LARGE TABLES WITH A SMALL MAIN MEMORY

[75] Inventor: Kenneth A. Ross, New York, N.Y.

[73] Assignee: The Trustees of Columbia University in the City of New York, New York, N.Y.

[21] Appl. No.: 531,789

[22] Filed: Sep. 21, 1995

[51] Int. Cl.$^6$ .................................................. G06F 17/30
[52] U.S. Cl. ........................................................ 395/602
[58] Field of Search ................................... 395/602, 601, 395/612

[56] References Cited

U.S. PATENT DOCUMENTS

| | | | |
|---|---|---|---|
| 5,241,648 | 8/1993 | Cheng et al. | 395/607 |
| 5,345,585 | 9/1994 | Iyer et al. | 395/602 |
| 5,537,589 | 7/1996 | Daal | 395/612 |
| 5,557,791 | 9/1996 | Cheng et al. | 395/602 |

OTHER PUBLICATIONS

Kitsuregawa, M., Harada, L., Takagi, M., "Join Stratagies on KD–tree indexed relations", Proceedings Fifth International Conference on Data Engineering, pp. 85–93. Feb. 1989.
Shapiro, "Join Processing in Database Systems with Large Main Memories", *ACM Transactions on Database Systems*, vol. 11, No. 3, Sep. 1986, pp. 239–264.
Valduriez, "Join Indices", *ACM Transactions on Database Systems*, vol. 12, No. 2, Jun. 1987, pp. 218–246.
Desai, "Performance of a Composite Attribute and Join Index", *IEEE Transactions on Software Engineering*, vol. 15, No. 2, Feb. 1989, pp. 142–152.
Blakeley et al., "Join Index, Materialized View, and Hybrid–Hash Join: a Performance Anaylsis", *Sixth International Conference on Data Engineering*, 1990 pp. 256–263.
Mishra et al., "Join Processing in Relational Databases", *ACM Computing Surveys*, vol. 24, No. 1, Mar. 1992, pp. 63–113.
Perrizo et al., "Distributed Join Processing Performance Evaluation", *Proceedings of the Twenty–Seventh Annual Hawaii International Conference on System Sciences*, 1994, pp. 236–245.

*Primary Examiner*—Thomas G. Black
*Assistant Examiner*—Jack M. Choules
*Attorney, Agent, or Firm*—Brumbaugh, Graves, Donohue & Raymond

[57] ABSTRACT

A technique for efficiently joining multiple large tables in a database system with a processor using a small main memory. The technique utilizes a join index and minimizes the number of Input/Output operations while maximizing the use of the small main memory through a buffer allocation process. The technique partitions available main memory into buffers and assigns conditions to the buffers to ensure that each buffer will receive a substantially equal amount of data in the join result. The technique then processes each input table separately based on the assigned conditions and sequentially reads and processes each input table. The output is vertically fragmented with one fragment for each input table which further allows the individual processing of each input table. Also described is a method for creating a join index if one is not present.

35 Claims, 12 Drawing Sheets

201
FIRST TABLE

| NAME |
|------|
| SMITH |
| DAVIS |
| BROWN |
| JONES |
| DAVIS |
| BLACK |
| SMITH |
| DAVIS |
| DAVIS |

260

205
SECOND TABLE

| COURSE | INSTRUCTOR |
|--------|------------|
| 101 | GREEN |
| 102 | YELLOW |
| 102 | YELLOW |
| 104 | WHITE |
| 105 | EVANS |
| 103 | GREEN |
| 109 | GREY |
| 106 | ALBERTS |
| 106 | BEIGE |

| | $R_2 < 20$ (301) | $20 \leq R_2 < 45$ (303) | $45 \leq R_2 < 70$ (305) | $70 \leq R_2$ (307) |
|---|---|---|---|---|
| $R_3 < 30$ (309) | B1 | B2 | B3 | B4 |
| $30 \leq R_3 < 60$ (311) | B5 | B6 | B7 | B8 |
| $60 \leq R_3 < 80$ (313) | B9 | B10 | B11 | B12 |
| $80 \leq R_3 < 115$ (315) | B13 | B14 | B15 | B16 |
| $115 \leq R_3$ (317) | B17 | B18 | B19 | B20 |

$R_2$ across top, $R_3$ down side, 300

FIG. 3

FIRST INPUT TABLE

| | STUDENT | COURSE |
|---|---|---|
| 1 | SMITH | 101 |
| 2 | SMITH | 109 |
| 3 | JONES | 104 |
| 4 | DAVIS | 102 |
| 5 | DAVIS | 105 |
| 6 | DAVIS | 106 |
| 7 | BROWN | 102 |
| 8 | BLACK | 103 |
| 9 | FRICK | 107 |

401C = row index, 401A = STUDENT, 401B = COURSE, 401 = table

SECOND INPUT TABLE

| | COURSE | INSTRUCTOR | TITLE |
|---|---|---|---|
| 1 | 101 | GREEN | MATH |
| 2 | 102 | YELLOW | PHYSICS |
| 3 | 103 | GREEN | STATISTICS |
| 4 | 104 | WHITE | HISTORY |
| 5 | 105 | EVANS | GEOLOGY |
| 6 | 106 | ALBERTS | ART |
| 7 | 106 | BEIGE | ART |
| 8 | 108 | RED | FRENCH |
| 9 | 109 | GREY | ENGLISH |

403D = row index, 403A = COURSE, 403B = INSTRUCTOR, 403C = TITLE, 403 = table

THIRD INPUT TABLE

| | INSTRUCTOR | OFFICE |
|---|---|---|
| 1 | ALBERTS | 701 |
| 2 | YELLOW | 407 |
| 3 | WHITE | 501 |
| 4 | WHITE | 402 |
| 5 | GREEN | 401 |
| 6 | RED | 401 |
| 7 | BEIGE | 502 |

405C = row index, 405A = INSTRUCTOR, 405B = OFFICE, 405 = table

JOIN INDEX

| | TABLE 701 | TABLE 703 | TABLE 705 |
|---|---|---|---|
| 1 | 1 | 1 | 5 |
| 2 | 3 | 4 | 3 |
| 3 | 3 | 4 | 4 |
| 4 | 4 | 2 | 2 |
| 5 | 6 | 6 | 1 |
| 6 | 6 | 7 | 7 |
| 7 | 7 | 2 | 2 |
| 8 | 8 | 3 | 5 |

407D = row index, 407A, 407B, 407C = columns, 407 = table

FIG. 4A

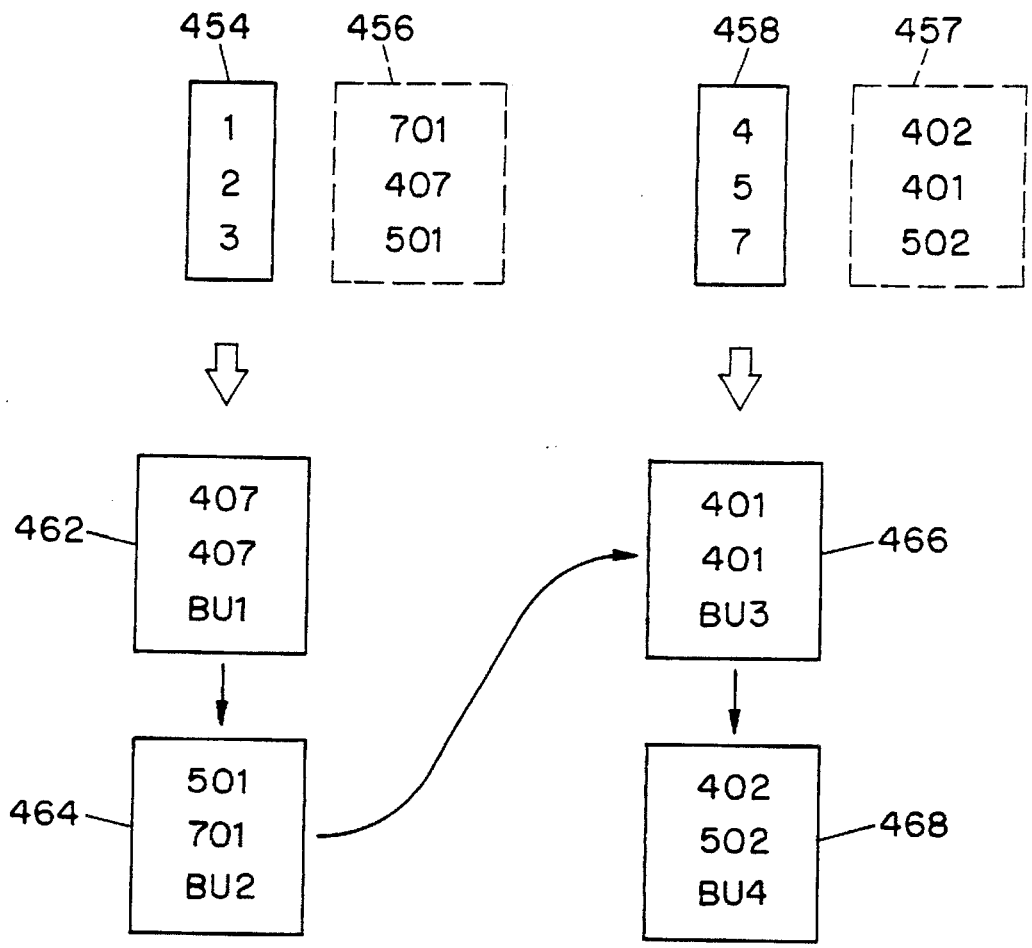

JOIN INDEX
| TABLE 501 | TABLE 503 |
|---|---|
| 2 | 5 |
| 3 | 1 |
| 3 | 6 |
| 4 | 3 |
FIG. 5C
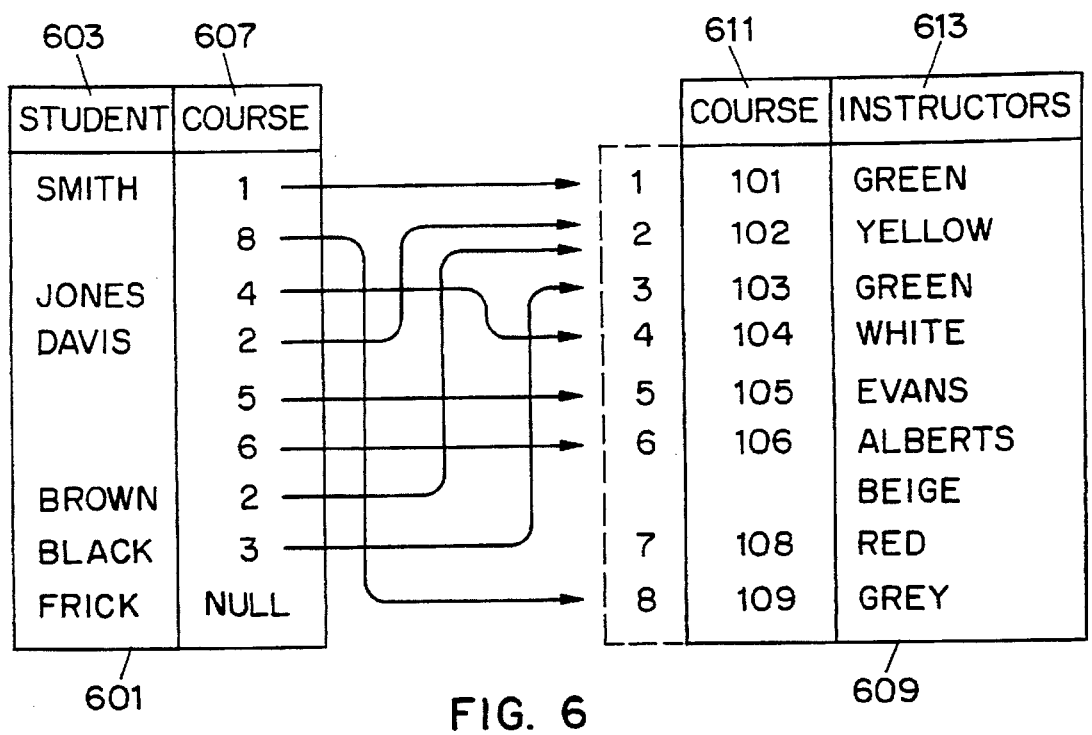
FIG. 6
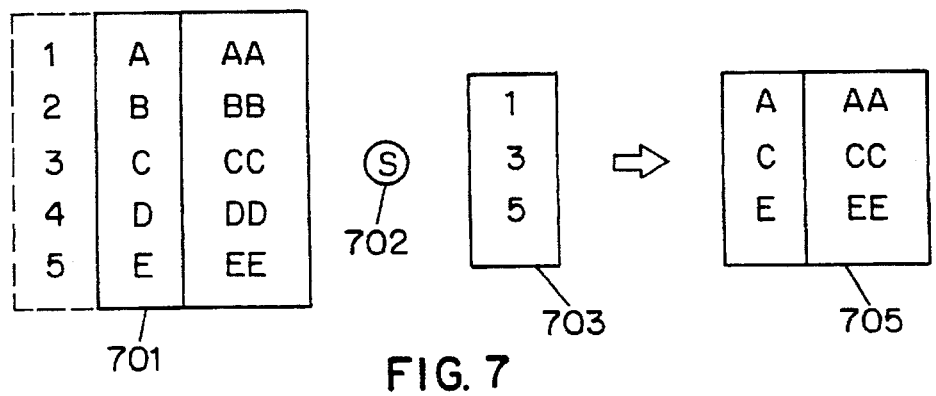
FIG. 7

INPUT TABLE 1

| 1 | A1 | 1 |
|---|----|---|
| 2 | A2 | 2 |
| 3 | A3 | 3 |
| 4 | A5 | 4 |

801

INPUT TABLE 2

| 1 | X | a |
|---|---|---|
| 2 | Y | b |
| 3 | Z | c |
| 4 | W | d |

803

INPUT TABLE 3

| 1 | a | B1 |
|---|---|----|
| 2 | b | B2 |
| 3 | c | B3 |
| 4 | d | B4 |

805

HYBRID JOIN INDEX

| TABLE 1 | TABLE 2 | TABLE 3 |
|---------|---------|---------|
| 1 | X | 1 |
| 2 | Y | 2 |
| 3 | Z | 3 |
| 4 | W | 4 |

OUTPUT FILE

| A1 | 1 | X |
|----|---|---|
| A2 | 2 | Y |
| A3 | 3 | Z |
| A4 | 4 | W |

809

OUTPUT FILE

| a | B1 |
|---|----|
| b | B2 |
| c | B3 |
| d | B4 |

SYSTEM AND METHOD FOR PERFORMING AN EFFICIENT JOIN OPERATION ON LARGE TABLES WITH A SMALL MAIN MEMORY

The National Science Foundation contributed to the research which led to this invention. The government may have rights to this invention.

FIELD OF INVENTION

The present invention is directed towards an efficient join operation in a database system, and more specifically toward joining tables containing a large amount of data using a join index in a system with a relatively small amount of main memory.

BACKGROUND OF THE INVENTION

The "join" operation used in database systems is the fundamental operation that allows information from different data tables to be combined in a selected way. Tables consist of collections of data grouped by a common subject matter, such as names or ages. The join operation allows a user to combine selected groups of data from multiple input data tables according to a specified condition between the records in each table to be combined. For example, a user may wants to join two tables, the first containing names and telephone numbers, and the second containing names and addresses, to produce a result which contains all the records that include common names between the two tables with both their telephone numbers and addresses. The join operation is used during a "query", or data request operation, by the user of a database system. Join operations are typically expensive in terms of processing time making efficiency a critical component to performance of the database system.

In some cases, tables of data will be very small relative to the amount of main memory (also called random access memory or "RAM") of the computer in the data base system. An example of a relatively small table is one that contains data of 30 students names and their quarterly grades. Tables are normally organized by columns of related data. In this case, all the names would appear in one column entitled "Names". In this example of 30 records, the entire table can be read into a typical main memory of a computer in one operation and can be completely processed while contained in RAM.

Other applications have input data tables that are significantly larger than the storage capacity of available main memory of the processor. These applications need to process huge amounts of information very quickly to keep up with vast amounts of input data. Examples of these applications are NASA's Earth Observing System, with an estimated 1 terabyte of data to be processed per day, and data mining applications which contain massive amounts of transaction information. As technology advances, more and more tables of large amounts of data will be needed to be processed in a database platform. Even considering the typical amounts of available RAM storage in large main frame computers, the size of their main memory is significantly smaller than the size of the vast input tables of data described above. In order to process such large amounts of data using a database system, efficient techniques for joining large relations are needed when the processor utilizes a smaller main memory.

Join results from joining input tables can be computed in a number of different ways. The term "ad-hoc join" is used to describe the process of taking two input tables in a database and forming the join result by processing the entire standard representations of each table, without the benefit of any pre-computed special data structures such as indices. When the pre-computed special data structures are present, the join operation will perform more efficiently.

One such pre-computed access structure is called a join index. The join index was introduced by Valduriez in "Join Indices", ACM Transactions on Database Systems, 12(2):218–246, 1987. A join index between two input tables maintains pairs of identifiers for records that would match if a particular join operation is performed. For example, one entry in a join index might be (1,3) which indicates that the first record in the first table will be joined with the third record in the second table when a particular join operation is performed. The join index may be maintained by the database system, and updated when records are inserted or deleted in the underlying tables. In situations where joins take place often, the processing cost of maintaining a join index will be small compared to the savings achieved in performing the join operations using the join index.

Valduriez proposes a technique to perform join operations using a join index in his article. The described method for performing the join operation requires a large amount of main memory (see Valduriez article, page 223). The four steps of the Valduriez method for performing the join operation using a join index on two input tables designated A and B stored in a database are: (1) read in a portion of the join index (previously constructed) and selected matches between the join index entries and the records in A which will fit into available main memory; (2) internally sort the records from A and the join index entries by their table B identifiers; (3) select matches between the join index entries and the records in B outputting the resulting record; and (4) read in the next portion of the join index and the selected records of A. Repeat steps 2, 3 and 4 until all index entries in the join index are processed.

The Valduriez method has significant drawbacks when the input tables are large and the processor uses a relatively small main memory. The primary detriment is that there is a large amount of repetitious Input/Output ("I/O") cycles which must be performed during the join operation. Blocks of records in input Table B are often accessed numerous times when records located in the same disk block are indicated throughout the join index for Table B. The access repetition is caused by only processing a portion of the join index at one time. The Valduriez method is also only described for a maximum of two input tables being joined at one time.

An important consideration in measuring the efficiency of a join operation is the number and kind of disk accesses performed during that operation. The "cost" (processing time) of I/O operations becomes increasingly important when the tables to be joined are very large. A typical access of one block (typically 8000 bytes) of data stored on a disk using a conventional Fujitsu M2266 one gigabyte drive is about two milliseconds. The cost of rotational latency (moving the disk in a circular motion to the specified address) for that drive is about eight milliseconds. The seek time (moving the disk head up and down to the proper location on the disk) is about 16 milliseconds. Other drives have proportionate access times. While these costs are seemingly small when joining tables small in size, the costs increase drastically when the input tables are very large on the order described above. It then becomes increasingly important to minimize overall I/O operations to reduce the number of overall seek/rotational latencies caused by I/O operations and correspondingly reduce the operational cost ratio of seek/rotational latencies per block of data transferred.

SUMMARY OF THE INVENTION

In accordance with the present invention there is provided a method and system for performing a join operation in a database system on multiple tables comprised of individual records using a join index. The method and system of the present invention performs most efficiently when the input tables are large and the main memory used by the processor is small relative to the size of the input tables. The technique for joining tables using a join index requires reading each input table only once, writing the output data to an output file or files only once, and also maximizes the use of the available main memory through buffer allocation. The technique only reads data blocks containing selected records from the input tables which will be part of the join result. Minimizing the number of I/O operations by reducing the number of necessary read and write operations is very important for the efficiency of a join operation when the input tables are very large because I/O operations are very time consuming.

The method of the present invention, named "jive-join", includes the following steps: first, an array of memory buffers are created with individual allocation conditions to ensure that each buffer will receive an approximately equal number of records when the first phase of the join process is complete. Next, a pre-existing join index and records specified in the join index from the first table are read and the records are placed in the appropriate buffer based on the defined conditions and the values of the record identifiers for the other input tables in the join index. Temporary files for each input table except for the first table are created containing the join index entry for the given input table. The content of the memory buffers are written to a mass storage disk when the available memory in a particular buffer is full. The written records of the memory buffers are appended to the previously written records. The buffer can then accept more information. After the first table is processed, the remaining tables to be joined are then processed in sequence. The stored temporary files for each buffer associated with a particular input table are read into main memory and sorted. For each buffer or group of buffers the selected records in the table are read into main memory sequentially. The records are then written to an output file based on the original unsorted order of the temporary files in order to ensure that the records from each table will achieve the proper join result specified in the join index. Each table at the end of the join operation has a separate file or collection of associated files for its associated output which helps minimize the number of I/O processes by allowing the processor with a small main memory to completely process each input table only once.

If a join index is not pre-existing for a group of tables to be joined, an index can be created by using a number of different methods. One way is called the nested-loop method which checks for a possible join result between each record of every table against the records in all the other tables. After a join index is created, the jive-join technique can be used.

The jive-join method applies to the case where two or more tables are to be joined. The method works for relational databases, object-oriented databases, and other types of database which support some type of record indexing system.

One system platform which supports the implementation of the jive-join method includes a computer system with a central processing unit, limited main memory (RAM), a mass storage medium which contains input tables of large amounts of data and space to store the results of the join operation, and connectors to transfer data between the central processing unit and the mass storage medium.

BRIEF DESCRIPTION OF THE DRAWINGS

Further objects, features and advantages of the invention will become apparent from the following detailed description taken in conjunction with the accompanying drawings showing a preferred embodiment of the invention, in which:

FIG. 2D is a graphical representation of the join result of the two tables in FIG. 2A;

FIG. 3 is a graphical representation of a multi-dimensional buffering scheme used in the jive-join method when three tables are joined;

FIG. 4A is a graphical representation of three input tables and a join index;

FIGS. 4B, 4C and 4D are graphical representations of part of the intermediate and output files created during the jive-join method when joining the three tables in FIG. 4A;

FIG. 4E is a graphical representation of the join result of the three tables in FIG. 4A;

FIG. 5C is a graphical representation of the join index created by the method shown in FIG. 5B when applied to the input relations shown in FIG. 5A;

FIG. 6 is a graphical representation of two input object collections in an object-oriented data base;

FIG. 7 is a graphical representation of a local selection which can be used in conjunction with the jive-join technique;

FIG. 8 is a graphical representation of the operation of a hybrid join index which can be used in conjunction with the jive-join technique.

DETAILED DESCRIPTION OF PREFERRED EMBODIMENTS

The present invention is a join technique in a database system using a join index which will efficiently process large input tables in a join operation when the processor used for the operation uses a relatively small main memory. The technique, however, is not constructed to only operate when the main memory is small. The technique minimizes necessary I/O operations and maximizes the use of the available main memory through a buffer allocation scheme. For convenience, the technique will be called "jive-join."

Figure 1:
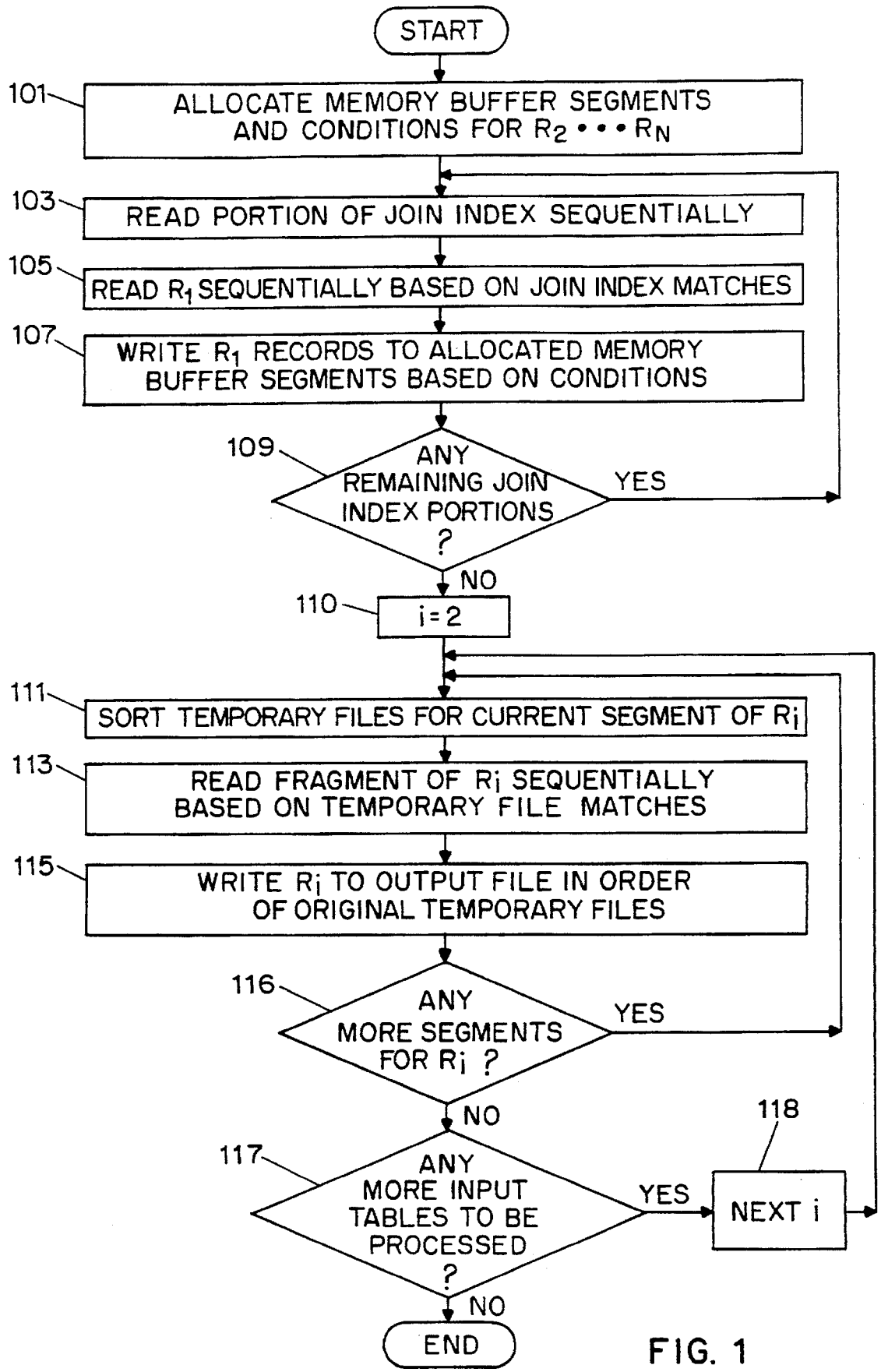
FIG. 1 is a flow chart of the jive-join method in accordance with the invention.

FIG. 1 is a flow chart showing the steps performed in the jive-join technique for joining multiple tables. The technique can be used for joining two or more tables together. The tables will be designated $R_i$ where i is the table number and there are N tables. Step 101 allocates the available main memory used by the processor into partitions called buffers and assigns conditions for each buffer, such that all the unique records fulfilling each buffer condition will fit into available main memory at one time later in the technique. The buffers themselves will only hold a portion of these selected records as explained below and all the buffers will exist simultaneously in available main memory in the initial steps of the technique. Main memory is a relatively fast access memory associated with a central processor; main memory is preferably RAM. Available main memory is that portion which is not allocated to another function or to another user in a multi-user computer system. The number of buffers is determined by the total number and size of unique selected records to be read from each input table. That number can be easily calculated from the join index. The number of buffers is not related to the records of the first input table. Thus, if the total size of the records to be read from a second input table during a join of two tables is three times the size of the available main memory, the memory will be partitioned into three buffers. When the number of input tables is three or more, the buffers will be cross-allocated with respect to each input table's records. The number of buffers created will then be the product of the relative size of the records to be read from each input table (except for the first table) to the size of main memory. For example, if the number of records read in the first input table is three times as large as available main memory and the number of records to be read in the second input table is twice as large as available main memory, six buffers will be created (3×2=6). Some portion of the main memory is reserved for more efficient sorting operations and temporary files which will decrease the size of available main memory which can be partitioned by that portion.

Each buffer is then assigned a condition based on the value of the record-identifiers (RIDs) in the join index for tables other than the first table. The conditions ensure that each of the buffers or group of buffers in the multi-join (three or more table being joined) case will receive a substantially equal number of participating records from each of the input tables. The allocation scheme is described in detail below. The allocation of three or more input tables requiring multidimensional buffering will be explained in depth with respect to FIG. 3. Examples of these allocations are shown in the discussion of FIGS. 2 and 4.

Step 103 reads a portion of the entries in the join index sequentially into main memory. The join index lists groups of related records between all the input tables which will be associated in the join result. The join index indicates the record's RID (record identifier—namely a record's physical or virtual location) of the related records in their tables. For example, the index (1,3,5) indicates that the first record of the first table is related in the join result to the third record of the second table and to the fifth record of the third table. While this example shows the record RID's to correspond to positions in the table, in practice record RID's contain a disk block pointer and an offset value of the record within the block. The join index will be used to read in the input tables sequentially and preserve the required relationships for the join result between the input tables.

Step 105 reads disk blocks containing the records from the first table $R_1$ selected by the memory-resident portion of the join index into main memory sequentially, and only reads disk blocks containing records present in the join index and therefore needed for the join result. If a record in $R_1$ is not in the join index, that record should not be present in the join result, and a disk block is therefore not read into main memory if the records contained therein are not selected records. The records from $R_1$ are always in sequential order relative to the join index because the join index was formed based on $R_1$. Sequential and discriminate access of disk blocks helps reduce I/O operations and time costs due to seek/rotational latencies.

The input tables and join index are stored in a mass storage medium. A mass storage medium is defined as any storage medium besides the designated main memory and could be located separate from the computer housing or in the same physical structure which contains main memory. The mass storage medium may be a disk.

Step 107 writes the selected records for $R_i$ corresponding to the join index into one of the buffers based on the previously calculated conditions for each input table. At the same time the records are written to a buffer, the join index entries for $R_2 \ldots R_N$ are written to temporary files associated with each buffer. For example, if there are only two tables, the records of $R_1$ would be divided based upon their value of the $R_2$ RID in the join index. The $R_2$ RID would be written to a temporary file associated with the designated buffer. When a buffer becomes full because there is no more available allocated memory for that buffer remaining, the data is "flushed" or written to a mass storage disk at a predefined location. The data will be written to contiguous regions of related data in the mass storage disk. The term mass storage disk again refers to any storage medium which is not RAM. After a buffer is flushed, the buffer can then accept additional data from the input table.

Step 109 checks if there are any more portions of the join index to be read. If there are remaining portions, the technique jumps to step 103. If the join index has been completely read and processed, then the technique goes to step 111. When all the R1 records from the input table have been flushed to disk and stored in output files corresponding to each buffer, the processing of the $R_1$ records of the join result will be complete and stored in a number of output files equal to the number of buffers. The buffers themselves will now be empty. The buffers can then be deallocated from available main memory and are not used in the remaining steps of the algorithm. The $R_1$ output files are then linked together by pointers from the end of one file to the beginning of another. By storing the results of the join operation for the $R_1$ records separately from the other tables' records, the results will be vertically fragmented.

Initially, the second input table is processed (i=two) as described in step 110. The order of processing the remaining tables besides the first table does not have an effect on the efficiency of the jive-join technique. Steps 111 through 118 will be used to process tables $R_2$ through $R_n$. Step 111 reads in turn the temporary files corresponding to a segment, which is a group of temporary files associated with one condition for an input table. The temporary files contain record identifiers from the join index for a given input table. The temporary files are read into memory and each segment (associated group of temporary files) is sorted by the appropriate RID. The original temporary files in the segment are preserved for later use. The sort routine places the appropriate RIDs from the temporary file in numerical order. The RIDs can be sorted with any known technique, such as a quick sort routine which is well known in the art. When three or more tables are joined, multiple temporary files associated with one condition for one input table are read together and a single combined sorted version is created. (See FIG. 3 and corresponding explanation). Output files corresponding to each buffer for each input table are created on a mass storage medium. For each input table number i, where i is two or greater, $R_i$ is then read sequentially into main memory reading only RIDs in the sorted temporary file in step 113. The records of $R_i$ are then written to the corresponding output file in the order of the original temporary file(s) in step 115. The original temporary file(s) preserve the order of each $R_i$ record RID in the join to produce a consistent ordering of the desired join result. The output files for $R_i$ are then joined together by pointers connecting the end of each file with the beginning of the next. Thus the join result is vertically fragmented.

Steps 116 checks if there are remaining segments (corresponding to a distinct buffer or group buffers for $R_i$) which have not been processed. If there are more segments for $R_i$, then the technique jumps to step 111. If all the segments (and thus corresponding buffers) have been processed for $R_i$, then the technique continues with step 117.

Step 117 checks if there are any more tables to be joined which have not yet been read. If there are no more tables, then the technique is done; all tables are joined and the results appear vertically fragmented in the output files. If other tables remain to be joined, then i is incremented in step 118 and the temporary files for the next table are sorted based on the indices of that table in the join index and steps 111 through 116 are repeated.

The final join result will be vertically fragmented for each joined table in that each input table will have a separate output group of files for the join results for that table. Vertical fragmentation allows each record of the input tables to be written out from main memory only once which minimizes the I/O operations.

FIGS. 2A–2D are graphic depiction of an example where the jive-join technique is applied to perform a join operation on two tables in a database system. The data is organized into tables of related data. The example is only illustrative and is not meant to limit the scope of the invention. An example of a join operation using three tables will be described in the discussion of FIG. 4.

Figure 2A:
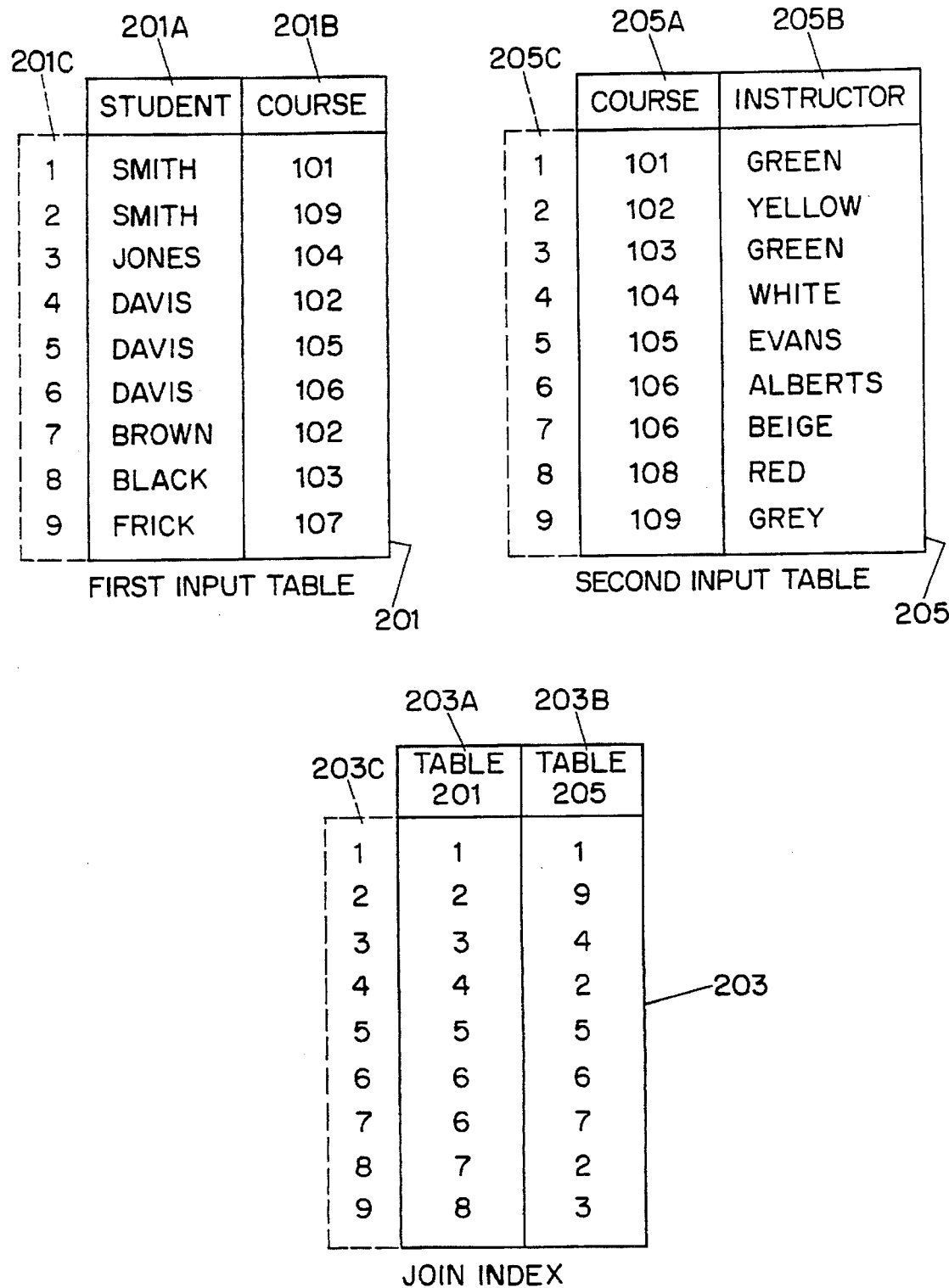
FIG. 2A is a graphical representation of two input tables and a join index.

FIG. 2A shows a first input data table 201 which includes columns of data entitled Student name 201A and their Course number 201B. Also included with table 201 is a column of sequential record identifiers 201C which shows the order of the records in this example. A set of numbers 201C do not in practice appear with the table 201, but are present only for this explanation. Table 205 is a table to be joined with table 201 and includes columns of data entitled Course number 205A and its Instructor 205B. Also included for this explanation is a column of sequential record identifiers 205C which shows the order of the records in this example. The data contained in the two tables are to be joined together producing a join result only of records of each table which fulfill a desired join condition. For this example, only records from first table 201 which have the same course number as records in second table 205 will be in the join result. Additionally, all columns in first table 201 and second table 205 will be present in the join result so that the join result will have a student column, a course column and an instructor column. It is also possible to select only some of the columns from the input tables to become part of the join result.

The join index 203 shows pairs of related records which will be present in the join result. The join index is considered to be pre-existing for use with the jive-join technique, although a join index can be created if needed and is discussed below (See discussion of FIG. 5). The join index contains a first column 203A of the record identifiers of the first table 201 records to be joined, a second column 203B of the record identifiers of the second table 205 records to be joined, and a third column 203C included only for this explanation, which is a column of sequential record identifiers 205C to show the order of the records. Each entry in each record in the join index is called a record identifier value. Column 203B is thus made of second table 205's RID values. In this example, the join index represents matches of the course number of the student from table 201 with the course number of the instructor in table 205. In this example we assume that one record occupies one disk block. In practice, it is typically the case that many records fit in each disk block.

Figure 2B:
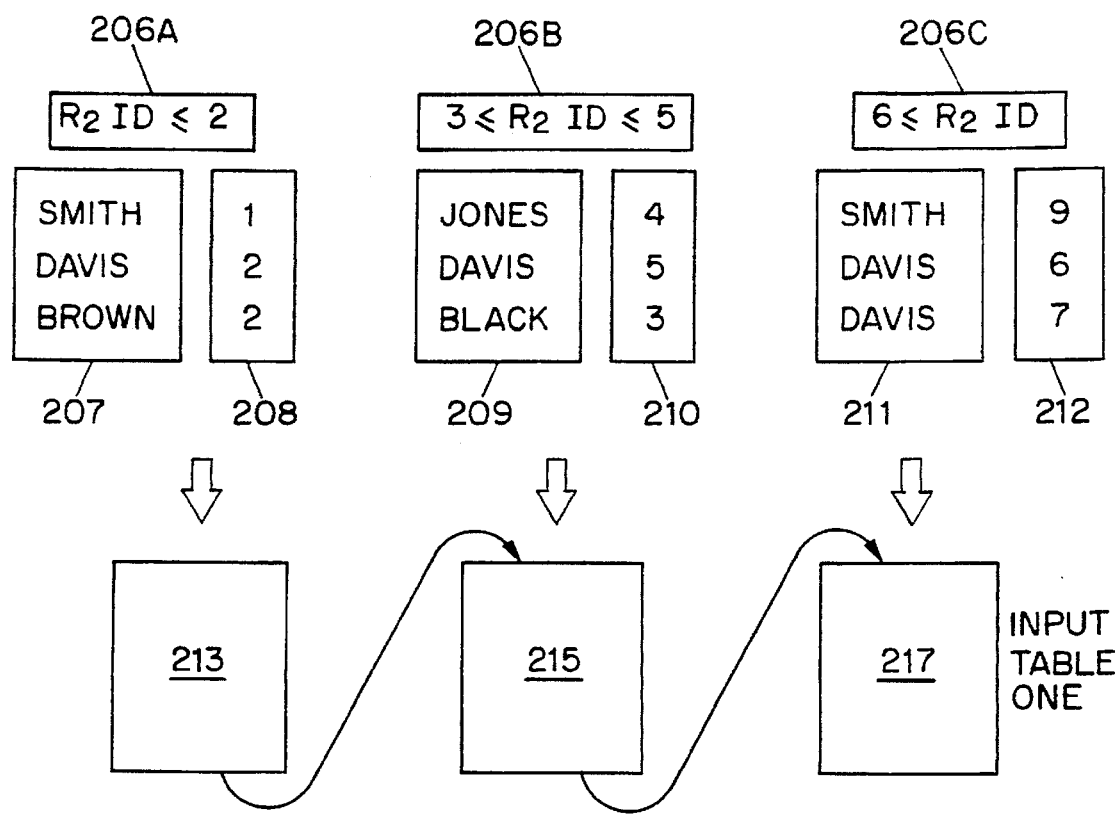
FIG. 2B is a graphical representation of part of the intermediate and output files created during the jive-join method when joining the two tables in FIG. 2A.

FIG. 2B shows some of the intermediate results of the jive-join technique applied to the input tables in FIG. 2A, which is shown to help explain the jive-join technique. First, buffers are created from the available main memory and allocated based upon the sizes of the unique records to be joined from second table 205 compared to the size of available main memory. Portions of the main memory may be reserved for sorting techniques, temporary files and reading in portions of the join index and are not considered part of available main memory. In the example, available main memory is capable of holding three full records at one time and all the records are the same size. The records could be varied in size depending on the type of data and number of columns. From the join index, it is determined that second table 205 will have eight distinct records in the join result which will be read in, which is approximately three times larger than main memory, so three buffers will be created. Although the join result will have nine records, only eight records will be read from $R_2$ because one record is used twice. Two buffers would be insufficient because the number of records associated with each buffer will exceed the three record limit. When this example is extrapolated out to actual size contemplated for use, it is expected that thousands, millions, or even billions of records would be processed. All the records associated with one buffer must be able to fit into the available main memory at one time for processing. The buffers are allocated according to conditions determined for second table 205 join index RID values in order to distribute the records of second table 205 between the three buffers close to equally. The second table 205 RID values appear in the join index 203 in column 203B which indicates the record identifiers of the records to be included in the join result. The determination of the exact conditions associated with each buffer based upon the RIDs are described below. The allocation can be determined to substantially equally distribute the second table 205 RIDs using the join index.

In this example, the first buffer 207 condition is defined as the second table 205 RID is less than or equal to two (condition shown in 206A). The second buffer 209 condition is defined as the second table 205 RID is greater than or equal to three and less than or equal to five (condition shown in 206B). The third buffer 211 condition is the second table 205 RID is greater than or equal to six (condition shown in 206C). The buffers are allocated so that the relative aggregate sizes of the matching records from $R_2$ will be about the same and individually fit into main memory. In this case, available main memory holds three records. Since main memory can hold three records, we have space in each of the three buffers for one record in available main memory at a time in this example.

The next step in the jive-join technique is to read the join index into main memory and to read the selected records from first table 201 by only reading a data block containing a record if an entry is present in the join index for that particular record. The selected record is then placed in the appropriate buffer based upon the corresponding second table 205 RID (entry in the join index). Thus the first record in first table 201 (Smith— 101) will be read and placed in buffer 207 because the corresponding second table 205 RID to the record is one. (The first join index entry is (1,1)). A value of one for the second table 205 RID fulfills the condition 206A of being less than or equal to two. Another example is that the third record in first table 201 (Jones— 104) will be read into memory and placed in buffer 209 because the corresponding second table 205 RID is four (the third join index entry is (3,4)) which fulfills the condition expressed in 206B of the second table 205 RID being greater than or equal to three and less than or equal to five.

First table 201 is read from a mass storage disk in sequential order to minimize seek and rotational latencies but a particular data block will only be read if a corresponding entry for a record in that block is included in the join index. In this example, the ninth record of first table 201 (Frick—107) will never be read into main memory because there is no entry for the ninth record of first table 201 in the join index and therefore an I/O read operation can be saved. By only reading data blocks containing records referred to in the join index, many I/O operations can be saved during a join operation when many records will not be selected for the join result and not be in the join index.

When each record of first table 201 is written to one of the buffers, the corresponding second table 205 RID is written to a temporary file which is associated with each buffer. The temporary files will contain second table 205 RIDs which correspond to the selected first table 201 records in the order which the first table 201 records were read and placed in the appropriate buffer. The temporary file 208 is associated with the first buffer 207, the temporary file 210 is associated with the second buffer 209 and the temporary file 212 is associated with the third buffer 211. After processing the records from the first table 201 and the RIDs for the second table 205 associated with the selected first table's records, temporary file 208 will contain the second table 205 RIDs corresponding to the records of first table 201 which were written to buffer 207. Because the first table's records are placed in a buffer according to the conditions for the associated second table's 205 RIDs, the temporary file 207 will contain the lowest third of all the second table 205 RID's in the join index. In this example, the second table's 205 RID values in temporary file 207 are one, two and two, which are the lowest RID values.

The three buffers are located in main memory at the same time, and since main memory in this example will only hold three records at one time, the contents of the buffers will need to be stored elsewhere when the available main memory is full. When a buffer reaches its maximum storage allocation when being written to with records from first table 201, the data in the buffer is "flushed", or written to a mass storage disk at a predetermined location. The buffer is then cleared of data and ready to accept more data from the input tables. The number of times each buffer will be flushed will depend on the allocated buffer size and the size of the input tables. Each time a buffer is flushed, it is written to a disk location following the previous flush for that buffer. The buffer can contain a set of pointers to manage the file. The files associated with the output of the buffers located on the disk are called output files. The temporary files 208, 210 and 212 will also be periodically flushed to outside files when the designated memory is full. This may occur at the same time the corresponding records are flushed or done independently.

The flushing process creates output files on the disk which are shown as output file 213 corresponding to the first buffer 207, output file 215 corresponding to the second buffer 209, and output file 217 corresponding to the third buffer 211. The temporary output files are not shown. After the selected records from first table 201 are read for every join index entry, the records of first table 201 which are included in the join result are stored after all flushes in files 213, 215 and 217. A pointer at the end of output file 213 is directed to the start of output file 215 and a pointer at the end of output file 215 is directed to the start of the output 217 which connects all three output files together. The files could also be linked in other ways than by pointers. For example, a separate descriptor file could be kept which stored the location of the beginning of each output file. The join result for the records from first table 201 is now complete. At this point in the jive-join technique, the results of the join operation for the first table 201 records are stored separately in the output files 213, 215 and 217 on disk.

Figure 2C:
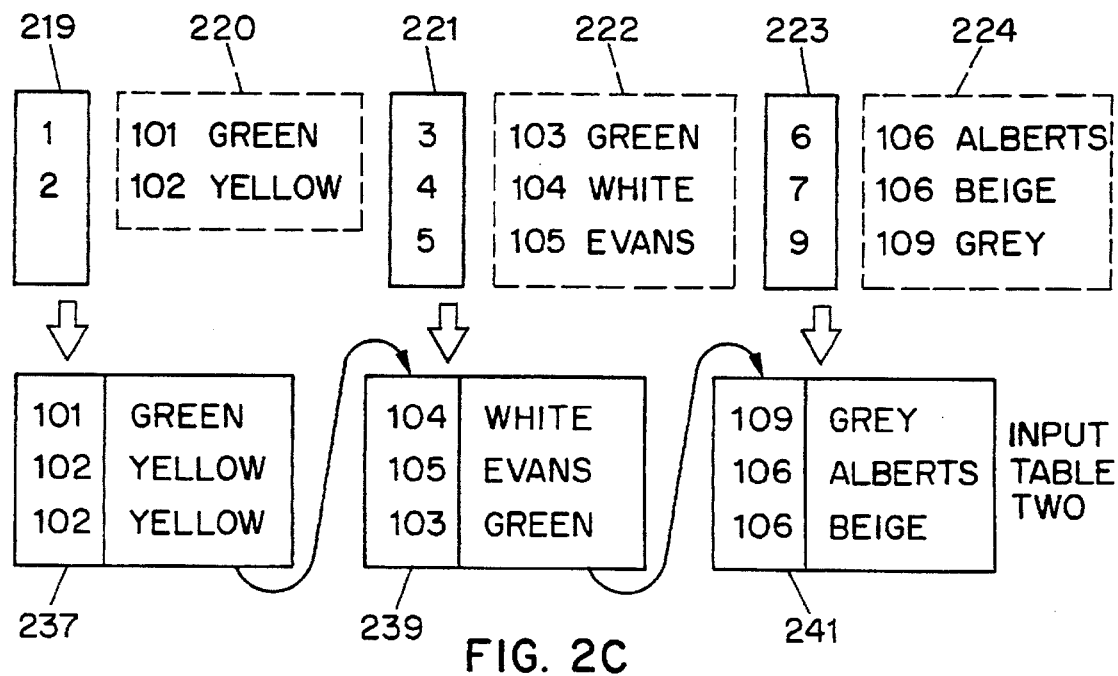
FIG. 2C is a further graphical representation of part of the intermediate and outputs files created during the jive-join method when joining the two tables in FIG. 2A.

FIG. 2C shows the intermediate results of the next steps in the jive-join technique applied to the tables in FIG. 2A. The technique continues by reading the temporary files 208, 210 and 212 which include the second table 205 RIDs already partitioned by condition and corresponding to the already outputted records from first table 201. Temporary file 208 is read and sorted by the second table 205 RIDs, duplicates of the second table 205 RID from file 219 are eliminated and the results of the sort appear in file 219 which is located in main memory. The original temporary file 208 is preserved. Boxes 220, 222 and 224 show the corresponding entry from the second table indicated by the RID. The records from second table 205 are then read sequentially in data blocks based upon the sorted second table 205 RIDs. Because the second table 205 values have been previously partitioned in the temporary files which are associated with each buffer based on the defined conditions 206A, 206B, and 206C, the participating second table 205 records with RID values in the lowest third of all the second table's RIDs will be read at this time. The selected records of second table 205 are then placed in available memory. The records will be written to the corresponding output file in the order of the unsorted temporary file (files 208, 210 or 212 corresponding to the order of the selected first table 201 records) to ensure that the corresponding records of first table 201 and second table 205 will be in the same sequence. If the unsorted temporary file lists a second table 205 RID multiple times, the selected second table 205 record will be written to the output in each of those places identified by the second table 205 RID.

The remaining temporary files are then processed in the same manner. Temporary file 210 is read and sorted by the stored second table 205 RIDs and the results of the sort are shown in file 221 located in RAM. Any duplication of second table 205 RIDs are eliminated. The records of second table 205 are again read sequentially in the buffer starting at the lowest second table 205 RID associated with the particular buffer (in this example the lowest RID is "3"). The records are then written to the corresponding output file in the order of the unsorted temporary file 210. The same process is performed for temporary file 212 with the results of the sort stored in file 223 located in RAM.

The results of processing the second input table 205 are written in the order of the corresponding unsorted temporary files to the join result output files 237, 239 and 241. A pointer is located at the end of output file 237 pointing to the beginning of the output file 239. A pointer is located at the end of output file 239 to the beginning of file 241. The second table 205 output files 237, 239 and 241 when taken together form the join result for columns from the second table 205.

Note that the first table 201 join result files 213, 215, 217 sequentially correspond with the second table 205 join result output files 237, 237, 241, respectively, and would form a table if the output columns were concatenated. The output of the join result is vertically fragmented because the output for each input table is stored separately. The vertical fragmentation allows a reduced number of I/O transfers by processing the records of each input table separately and only reading and writing the records from first table 201 and second table 205 once.

FIG. 2D shows a representation of the join result for first table 201 in column 260 and the join result for second table 205 in columns 262. Since the course column appears in both input tables 201 and 205, the course column could have been included with either output file. After the jive-join technique has been performed, the output files could be sorted by any desired column for a given application.

The jive-join technique also applies when the number of tables to be joined is greater than two. The steps of the technique described in FIG. 1 apply when there are two or more tables. The buffering scheme with three or more input tables is expanded from the previous example when joining two tables in order to allow any number of tables to be joined. The buffers are partitioned by conditions on the RIDs for every input table to be joined except for the first table. The records from the first table are already in sequential order with respect to the join index, and do not need to be partitioned. An example of a buffer scheme used when three tables are to be joined is shown in FIG. 3.

FIG. 3 shows a buffering scheme for joining three tables ($R_1$, $R_2$ and $R_3$) that is displayed as a grid 300 containing 20 buffers B1 through B20. The records of the first input table and corresponding RIDs from $R_2$ and $R_3$ will now be partitioned by both the $R_2$ RIDs and $R_3$ RIDs ($R_1$ is the first table). Along the top of grid 300 are the determined conditions for sorting the record RIDs of $R_2$. The selected conditions in this example are used to help explain the buffering scheme. Condition 301 is met when the $R_2$ RID is less than 20. Condition 303 is met when the $R_2$ RID is greater than or equal to 20 and less than 45. Condition 305 is met when the $R_2$ RID is greater than or equal to 45 and less than 70. Condition 307 is met when the $R_2$ RID is greater than or equal to 70. The conditions listed on the vertical side of grid 300 partition the records of $R_1$ and the associated RID values from $R_2$ and $R_3$ based upon the values of the $R_3$ RIDs. Condition 309 is met when the $R_3$ RID is less than 30. Condition 311 is met when the $R_3$ RID is greater than or equal to 30 and less than 60. Condition 313 is met when the $R_3$ RID is greater than or equal to 60 and less than 80. Condition 315 is met when the $R_3$ RID is greater than or equal to 80 and less than 115. Condition 317 is met when the $R_3$ RID is greater than or equal to 115.

A join index entry with a value of (1,25,83) being processed in the jive-join technique in this example would read the first record of $R_1$ and write it to buffer B14 based upon the values of the $R_2$ and $R_3$ RIDs. The $R_2$ RID is 25 which fulfills condition 303 for $R_2$ by being between 20 and 45. The $R_3$ RID is 83 which fulfills condition 315 for $R_3$ by being between 80 and 115. Each buffer B1–B20 will also have two associated temporary files in which the join index entries for $R_2$ and $R_3$ for the selected $R_1$ record will be separately stored. A second example is an index value of (2,4,119) which will store the second record of $R_1$ in buffer B17 based upon satisfying condition 301 for $R_2$ and condition 317 for $R_3$. When processing the second and third input tables, a number of temporary files will by read together as a segment, where a segment is defined as all the temporary files related to one condition for a single input table. Thus when $R_2$ is read and processed, the temporary files for $R_2$ associated with B1, B5, B9, B13, and B17 will be processed together for condition 301 as one segment which is read in, sorted, and used to read selected $R_2$ records. Segment examples for $R_3$ may be the $R_3$ temporary files for (B5, B6, B7, B8) and (B17, B18, B19, B20). Accordingly, when $R_2$ is being processed, the $R_2$ temporary files for each column of buffers on grid 300 will be read together as one segment to be sorted and used to sequentially read in selected records of $R_2$. The $R_2$ records will then be written to output file(s) based upon the original order of each temporary file associated with $R_2$. The buffering scheme is shown in a grid form for joining three relations which enables both input tables $R_2$ and $R_2$ RIDs to be used in allocating the buffering scheme. The records from $R_1$ will then be placed in the appropriate buffer for both of the other input tables, allowing each input table to be read sequentially.

The buffering scheme can be extended to the case of N tables to be joined by allocating buffers with conditions for each of the input tables except the first table. Thus, when five relations are to be joined, a four dimensional buffer will be allocated based upon conditions for the values of the RIDs for $R_2$, $R_3$, $R_4$ and $R_5$. If each table in that example is allocated into three groupings of defined conditions, the number of subsequent buffers will be the product of the number of conditions, or 3×3×3×3=81.

Figure 4B:
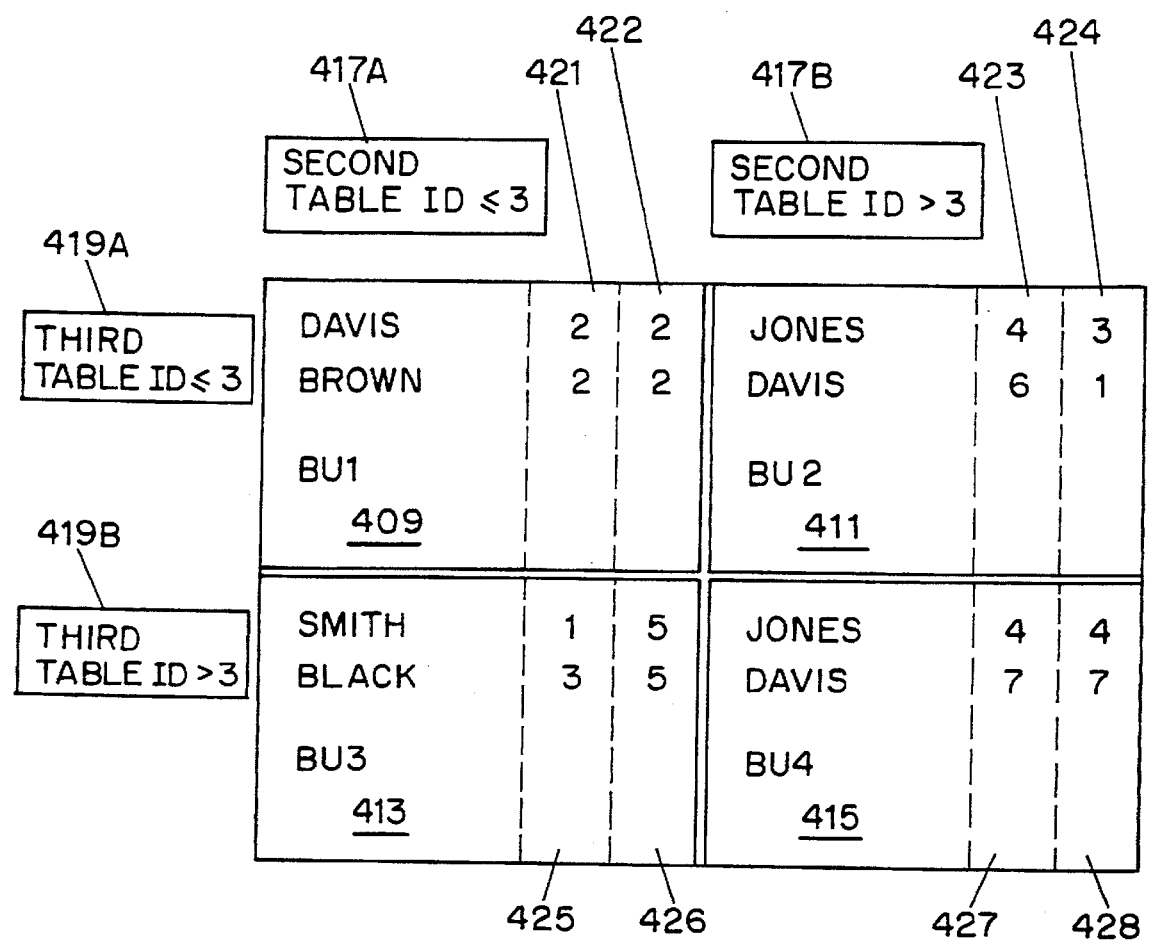
Figure 4B:
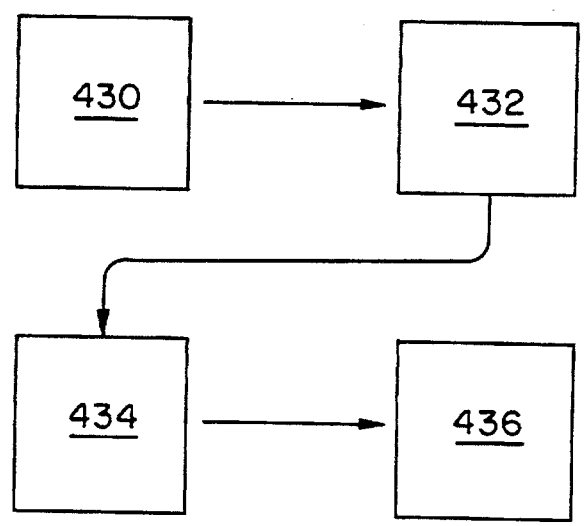

FIGS. 4A–4E show a graphic example of joining three tables using the jive-join technique. The example shown in FIGS. 4A–4E is not meant to limit the scope of the invention in any way, but is merely provided to help describe the operation of the jive-join technique when more than two input tables are joined. FIG. 4A shows three input tables to be joined and a join index which shows the relationship of the records for the join result. Table 401 includes records of student names and their course numbers. Table 403 includes records of course numbers and the associated instructor(s) for each course and the course title. Table 405 includes records of instructors and their office numbers. The join operation to be performed in this example will create a result table with all the instructors from table 403 who have common course numbers with a student in table 401, and who have an office or offices according to table 405. The join result will contain columns for Student, Course, Instructor, Title and Office. The join index 407 showing the relationship between the tables for the join result is either pre-existing before the jive-join technique is performed or created with one of several possible techniques. One such technique for creating a join index can be easily extrapolated from the description of FIG. 5. A nested loop for each input table would be used in the technique.

FIG. 4A shows first table 401 including a column of data entitled Student names 401A and a column entitled Course number 401B. Also included with table 401 is a column of sequential record identifiers 401C which shows the order of the records in the example. Column 401C does not in practice appear with table 401, but is solely present for this explanation. Table 403 is a table to be joined with table 401 and table 405, and includes a column of data entitled Course number 403A, a column entitled Instructor 403B and a column entitled Title 403C. Also included only for this explanation is a column of sequential record identifiers 403D which shows the order of the records in this example. Table 405 is to be joined with table 401 and table 403 and includes columns of data entitled Instructor 405A and Office number 405B. Also included for this explanation is a column of sequential record identifiers 405C which show the order of the records in this example. For this example, all columns except duplicates in the three input tables will be present in the join result. The join result will then comprise an output table having a Student name column, a Course column, an Instructor column, a Title column, and an Office Number column. Only a portion of the columns present in each input table which are not represented in the join index may be selected to be in the join result. For example, first table 401 may have included a column entitled "Grade" which would not be part of the join result.

The join index 407 shows the relationships of the corresponding records for each input table which will be present in the join result. The join index 407 contains a first column 407A of RIDs for first table 401 records to be joined, a second column 407B of RIDs for second table 403 records to be joined, a third column 407C of RIDs for third table 405 records to be joined, and a fourth column of sequential record identifiers for the join index 407, included only for this explanation which is a column of sequential numbers 407D to show the order of the index entries. In this example, the join index equates the course number of the student in first table 401 with the course number of the instructor in second table 403, and the instructor in second table 403 with the instructor in third table 405.

FIG. 4B shows a portion of the intermediate results of the jive-join technique applied to the input tables in FIG. 4A to help describe the operation of the technique. First, buffers are created from the available main memory and the number of buffers is based upon the sizes of the unique records to be joined compared to the size of memory. The exact calculation for the number of buffers is described in more detail below. The buffer partitions will be allocated according to conditions on second table 403 RIDs and on third table 405 RIDs and the conditions are determined to equally distribute the selected records from the input tables between the buffer segments (groups of related buffers). For this example, each selected record will be the same size. The second table 403 RIDs and third table 405 RIDs appear in the join index 407 along with the first table 401 RIDs which indicates the matching records in the second and third tables, respectively, to be included in the join result. In this example, the number of partitions is determined to be two for second table 403 and two for third table 405 for a total of four buffers (2×2=4). The buffers are designated as BU1 409, BU2 411, BU3 413 or BU4 415. In this example, the condition for the first buffer BU1 409 is defined as the second table 403 RID is less than or equal to three (shown as condition 417A) and the third table 405 RID is less than or equal to three (shown as condition 419A). The condition for the second buffer BU2 411 is defined as the second table 403 RID is greater than three (shown as condition 417B) and the third table 405 RID is less than or equal to three (shown as condition 419A). The condition for the third buffer BU3 413 is defined as the second table 403 RID is less than or equal to three (shown as condition 417A) and the third table 405 RID is greater than three (shown as condition 419B). The condition for the fourth buffer BU4 411 is defined as the second table 403 RID is greater than or equal to 3 (shown as condition 417B) and the third table 405 RID is greater than three (shown as condition 419B). The buffers are allocated so that the aggregate size of the participating $R_i$ for each segment will be close to but not greater than the size of available main memory, and a segment is defined as all the buffers related to one condition for an input table.

The next step in the jive-join technique is to read a portion of the join index 407 into the available main memory and to read data blocks containing selected records from the first table 401 only if a record has a corresponding entry in the join index. The join index and the selected records are read concurrently by reading in data blocks containing selected table 401 records which correspond to the join index portion read. After the selected records are processed, the next portion of the join index and selected records are read in until the entire join index and selected records are processed. To process selected records, each selected record is written to the appropriate buffer based upon the corresponding second table 403 RID and the third table 405 RID and the conditions associated with each buffer. Thus the first record in first table 401 (Smith—101) and its corresponding join index entry (1,1,5) will be read from a mass storage disk and written to the third buffer BU3 413 because the second table 403 RID is one and fulfills the condition 417A, and the third table 405 RID corresponding to the first record in table 401 is five, fulfilling the condition 419B. The intersection of the two fulfilled conditions is the third buffer BU3 413. Another example is that the third record in first table 401 (Jones—104) and its corresponding join index entry (3,4,3) will be read into memory and placed in the second buffer BU2 411 because the corresponding second table 403 RID record is four, fulfilling the condition 417B, and the value of the third table 405 RID corresponding to the first record of table 401 is three, fulfilling the condition 419A. The same record (Jones—104) with the join index entry (3,4,4) will also be placed in BU4 415.

First table 401 is read sequentially from a mass storage disk but a particular data block will only be read into main memory if an entry for a record on that block is included in the join index. Referring to FIG. 4A, the ninth record of first table 401 (Frick—107) will not be read into main memory because there is no corresponding RID entry in the join index 407 and therefore an I/O operation can be saved. By only reading those records referred to in the join index which should be included in the join result, many I/O operations can be saved during a join operation when there are many records in the input tables which will not be present in the join result because they are not selected for that particular join.

When each selected record of first table 401 is written to one of the buffers, the corresponding second table 403 RID and third table 405 RID are written to independent temporary files for each input table which are associated with each buffer. The RIDs in each temporary file are stored in the order of the selected first table 401. The temporary files 421 for second table 403 RIDs and temporary file 422 for third table 405 RIDs are associated with the first buffer 409; the temporary files 423 for second table 403 RIDs and temporary file 424 for third table 405 RIDs are associated with the second buffer 411; the temporary files 425 for second table 403 RIDs and temporary file 426 for third table 405 RIDs are associated with the third buffer 413; and the temporary files 427 for second table 403 RIDs and temporary file 428 for third table 405 RIDs are associated with the third buffer 411. Temporary files 421, 423, 425 and 427 as a group contain all the second table 403 RIDs which were written to the buffers. Temporary files 422, 424, 426 and 428 as a group contain all the third table 405 RIDs which were written to the buffers.

When a buffer reaches its maximum storage allocation, the data in the buffer is "flushed", or written to a mass storage disk at a predetermined location. The buffer is then cleared of data and ready to accept more data from the input tables. The number of times each buffer will be flushed will depend on the allocated buffer size and the size of the selected input tables records. Each time a buffer is flushed, it is written to a disk location following the previous flush for that buffer. The flushing process will create output files on the disk shown as output file 430 corresponding to the first buffer 409, output file 432 corresponding to the second buffer 411, output file 434 corresponding to the third buffer 413, and the output file 436 corresponding to the fourth buffer 415. After the selected records from first table 401 are read for every join index entry, the selected records of first table 401 which are to be included in the join result will have been stored in output files 430, 432, 434 and 436 after being flushed from available main memory. The output files will then be connected in a particular order. The order is arbitrary as long as all other output files are connected in the same sequence. In this example, a pointer at the end of output file 430 is directed to the start of output file 432. A pointer from the end of output file 432 is directed to the beginning of output file 434. A pointer from the end of file 434 is directed to the beginning of file 436 and the pointers connect the four output files to be one complete output file for the selected first table records. At this point in the jive-join technique, the processing on the first table 401 is complete and the results for the first table 401 are stored in its output files 430, 432, 434 and 436 which are separate from the other data related to other input tables in the join result.

Figure 4C:
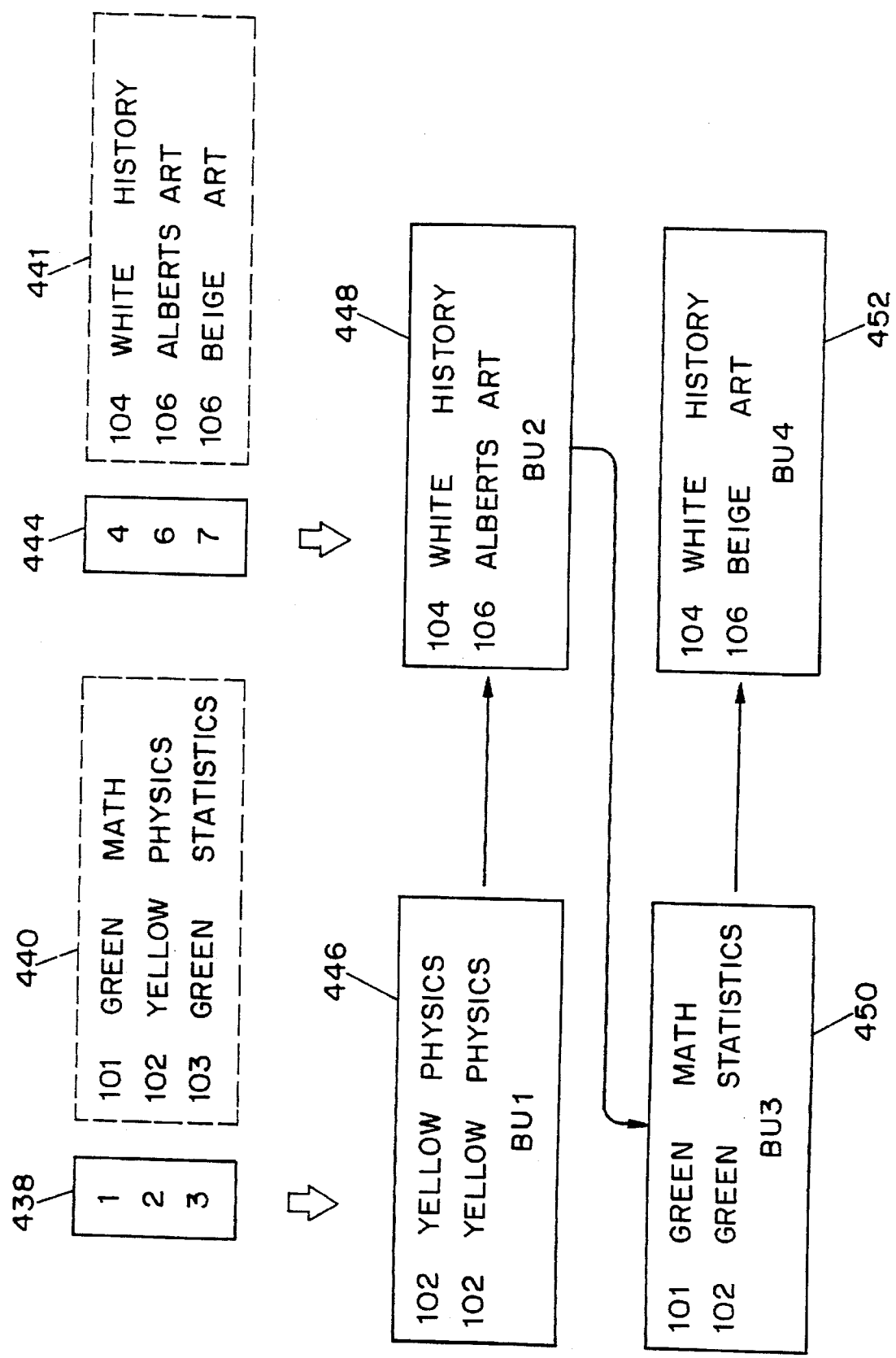

FIG. 4C shows a portion of the intermediate results of the next steps in the jive-join technique. The jive-join technique continues by reading the temporary files 421, 423, 425 and 427 corresponding to second table 403 shown in FIG. 4B and then the temporary files 422, 424, 426 and 428 corresponding to third table 405 also shown in FIG. 4B. The temporary files for each input table are read as segments which include all temporary files that satisfy a given condition for that table. For example, there will be two segments for second table 403: the first including all records with a second table 403 RID less than or equal to three (condition 417A), which includes temporary files 421 and 425. The second segment for second table 403 will include all records with a second table 403 RID greater than three, which includes temporary files 423 and 427. Each segment for the second table will therefore include one entire column of temporary files of $R_2$ RIDs in the representation of the buffers for second table 403. Segments for third table 405 will include one entire row of temporary files of $R_3$ RIDs in the buffer representation, corresponding to one condition based on the third table RID value.

A segment including temporary files 421 and 425 is read and sorted by the value of the second table 403 RIDs, the duplicate RID values are discarded and the results of the sort are stored in RAM (see file 438). The original temporary files 421 and 425 are retained. The data block containing selected records from second table 403 are then read sequentially into main memory based upon the sorted second table 403 RIDs stored in file 438. The selected records which are read in this example appear in box 440. Because the second table 403 RID values have been previously partitioned based on defined conditions 417A and 417B, all the RIDs relating to records located in the lowest half of the disk locations for table 403 located in the mass storage medium are read when the first segment is processed. The selected records are then written in the order of the associated unsorted temporary files to ensure that the corresponding records of first table 401 and second table 403 will be stored in the correct order in their output files. The records from table 403 must be placed in the unsorted order to preserve their relationship with the first input table and other input tables. If the unsorted temporary file lists a second table 403 RID multiple times, such as where multiple records from the first table are associated with one record from the second table, the selected second table 403 record will be written to the output file in all the places identified by the second table 403 RID.

A second segment for the second table 403 made of temporary files 423 and 427 is read, sorted by the second table 403 RIDs and duplicate values eliminated, the results of which appear in file 444 located in RAM (main memory). The data blocks containing records of second table 403 are now read sequentially starting at the lowest value of second table 403 RID in the segment (the segment includes buffers BU2 411 and BU4 415) and stored in main memory. The selected records which are read appear in box 441. The selected records are then written to the output file in the order of the unsorted temporary files 423 and 427 associated with the segment being processed.

The results of performing the jive-join technique for the second table 403 are then stored in the join result for second table 403 in output files 446, 448, 450 and 452. A pointer is located at the end of output file 446 directed to the beginning of output file 448. Pointers connecting the other files create basically a single file for the join result for second table 403. The first table 401's join result files 430, 432, 434, 436 sequentially correspond with the second table 403's join result output files 446, 448, 450, 452, respectively, and would form a table if the output columns were concatenated. Thus the second record in output file 430 corresponds to the second record in output file 446 and the same is true throughout the output files.

The same technique continues for processing third table 405 and is shown in FIG. 4D. There will be two segments for third table 405: the first including all records with a third table 405 RID less than or equal to three (condition 419A) which includes temporary files 422 and 424, and the second segment including all records with a third table 403 RID greater than three (condition 419B) which includes temporary files 426 and 428. Each segment will therefore include one entire row of temporary files for third table 405 in the buffering representations. A segment including temporary files 422 and 424 is read, sorted by the third table 405 RID and duplicates eliminated; the results of the sorted file appear in file 454 located in RAM. The original temporary files 422, 424 are also stored in RAM. Data blocks from third table 405 are then read sequentially from a mass storage disk based upon the values of the sorted third table 405 RIDs. The selected records which are read appear in box 456. Because the third table 405 values have been previously partitioned by conditions 419A and 419B, only RIDs located in the lower half of disk memory containing the third input 405 file will be read for this segment. The selected records of third table 405 are then read into available main memory. The selected records are written to a mass storage disk in the order of the unsorted temporary file to ensure that the corresponding records of first table 401, second table 403 and third table 405 will be stored in the same sequence to get the join result. If the unsorted temporary file lists a third table 405 RID multiple times, the selected third table 405 record after being read will be written respectively to the output file in the places identified by the second table 403 RID.

The second segment made of temporary files 426 and 428 is then read and sorted by the value of the third table 405 RID, the results of which appear in file 458 located in RAM. The records of third table 405 are read sequentially starting at the lowest of the third table 405 RID in the segment (which includes buffers BU3 413 and BU4 415) and stored in available main memory. The selected records which are read appear in box 457. The second segment includes third table 405's RIDs in the upper half of the RIDs in the join index. The records are then written to an output file in the order of the unsorted temporary files 426, 428.

The results of performing the jive-join technique for the third table 405 are then stored in the join result for the third table 405 in output files 462, 464, 466 and 468. The output files are connected in the same manner as the output files for the other input tables. A pointer is located at the end of output file 462 directed to the beginning of the output file 464. Pointers connecting the other files create basically a single file for the join result of third table 405. The first table 401 and second table 403 join result files sequentially correspond with the third table 405 join result files and would form a table consistent with the join index if the output columns were concatenated. The output files for first table 401, second table 403 and third table 405 are stored separately to enable each input table to be processed separately. These separated files are vertical fragments of the join result. Vertical fragmentation allows a reduced number of I/O transfers by only once reading and writing first table 401, second table 403 and third table 405 and not requiring other I/O accesses to construct a join result. Join result tables which are vertically fragmented by columns can be easily combined for random access when generating an index for the join result. For sequential processing of the join result, there is only an insignificant overhead of having several vertical partitions compared with a non-partitioned representation. The join result is shown in FIG. 4E which consists of the vertically fragmented output files 470, 472, 474 where file 470 contains the join results for the first table, file 472 contains the join result for the second table and file 474 contains the join result for the third table.

The order of processing second table 403 and third table 405 is arbitrary because each table is allocated according to the conditions of the remaining tables besides first table 401. The first table should preferably be the largest input table because the buffering scheme does not rely on the size of the records from the first table. The buffer allocation allows the jive-join technique to be more flexible in processing input tables than if the third table 405 was simply joined to an intermediary join result after first table 401 and second table 403 were joined. The present technique allows for fewer I/O operations for each of the input tables because the buffering structure allows each input table to be sorted and read sequentially and the output is vertically fragmented. Moreover, there is no additional I/O operations for intermediate join results in the jive-join technique which would be required if each table was joined one at a time to the others.

Figures 5A, 5B:
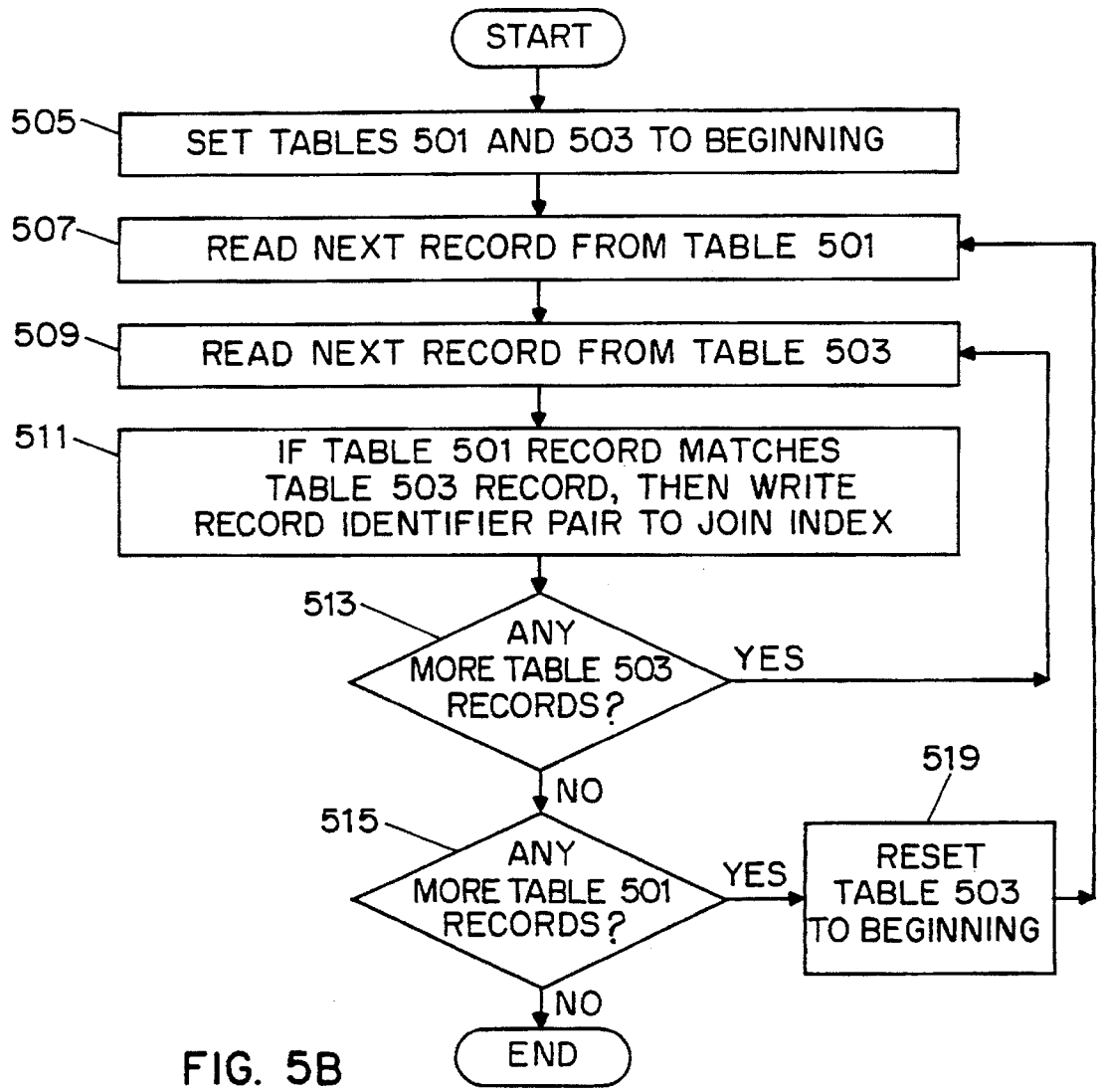
FIG. 5A is a graphical representation of two tables upon which a join index has not yet been created.
FIG. 5B is a flow chart of the steps of the nested loop method which creates a join index for the two tables.

FIGS. 5A–5C graphically illustrate the steps for generating a join index for two input tables if a join index is not present. A join index of some type is required to implement the jive-join technique. The method described here is an example of generating a join index using a nested-loop, and is only one of many ways to accomplish this task.

FIG. 5A shows two tables from which a join index is to be formed by matching the course numbers. Table 501 contains four records of course numbers and student names. Table 503 contains six records of course numbers and instructors. The sequential numbers next to the tables indicate the record identifiers. During the operation of this nested-loop technique, each record of table 501 in the Course number column will be compared against each record of table 503 in its Course number column, and if a match occurs, the relationship will be saved in the join index.

FIG. 5B shows a flow chart of the method for generating the join index using the nested-loop technique. Step 505 sets a record indicator for table 501 and a record indicator for table 503 both to predefined location of the first record in their respective tables. Step 507 reads in a record of table 501 which is the first record of the first table 501 in the beginning of this process. Step 509 reads in a record of table 503, which is the first record of table 503 in the beginning of this process. In step 511, the records read in steps 507 and 509 are compared. If the records are equal, the record identifiers of the two records are written to the join index. Step 513 checks if there are any more records from table 503 which have not been read for the current table 501 record. If there are no more records, the process goes to step 515. If there are more records in table 503, then the process jumps to step 509 to read the next record from table 503. Step 515 checks if there are any more records from table 501 which have not yet been read. If there are more records, table 503 is reset to the beginning in step 519. The process then jumps to step 507 and reads the next record from table 501. If in step 515, there are no more records to be read in table 501, the process is finished. Thus, each record of table 501 is compared to each record of table 503. The process produces a table of record identifiers (join index) showing the pairs that would be joined if a join operation was performed using the chosen join column. The join index produced for the input table in FIG. 5A is shown in FIG. 5C.

FIG. 6 is a graphical representation of tables stored in an object-oriented database. The jive-join technique is applicable to object-oriented databases. The previous examples corresponding to FIGS. 2 and 4 correspond to relational databases where data is stored and indexed relative to other related data. In object-oriented databases, pointers are kept to identify the relationships of data. Data related in subject matter are kept as groups of data, which is an equivalent to a table of data in a relational database. If a separate join index relating one group of data to another is present in the database, then the jive-join technique works the same way as described in FIGS. 1 through 5.

FIG. 6 shows a variation of a join index that may occur in object-oriented databases. The join index becomes part of the first group of data as an additional column in the group and contains pointers to a second group of data from which a join result will be formed. In FIG. 6, first table 601 contains a first data column 603 of Student names and a second data column 607 of Index entries pointing to second table 609 Which are associated with the records of table 601. The second table 609 contains a first data column 611 of Course numbers and a second data column 613 of Instructors. Although the data is described in columns in this example, the data is not actually stored in that format in object-oriented databases. The desired join result is a table including the student name, course number, and instructor. The index numbers in index 607 point to the related entry in table 609 which has a matching course number and one or more instructors.

In the example shown in FIG. 6, the jive-join technique must be slightly modified because there is no independent join index to initially read into main memory. Additionally, the first step of allocating the memory buffers is dependent on reading the join index for optimal allocations. A join index could be constructed from the index column 607 in first table 601. However, in the object-oriented world, it may not be desirable to read in all of the first table 601 in order to obtain the join index relationship. Instead the buffers can be divided evenly to approximate the output distribution. If significant skew occurs in the records of the second table 609 due to varied record size or repetition, the performance of the technique will decrease. An alternative solution is to sample the objects of the first table 601 to get their index pointer values. Given that the input tables are very large for optimal use, the sample would only need to be a small portion of the entire table to statistically calculate an allocation that is close to optimal.

Once the allocation of the buffers based on the second table's 609 RIDs is made, the jive-join technique is performed in the same manner as described in FIG. 1. The record including its index reference(s) will be read in together. The jive-join technique is applicable for at least two object groups (tables) to be joined and the multiple dimensional buffering scheme works in the same manner as previously described in conjunction with FIG. 3.

The jive-join technique will be operable in any database system which includes at least one way to logically connect groups of data together. The technique is not limited in applicability to relational and object-oriented databases which have been described in the examples provided herein.

FIG. 7 is a graphical representation of a local selection which can be incorporated into the jive-join technique. A local selection chooses a subset of a table to be in a join result. Table 701 is an example of a table upon which a local selection can be performed. Local index 703 is a table with the RIDs of the records which satisfy the local selection condition. Symbol 702 indicates a local selection will be performed on table 701 using local index 703. Table 705 is the selection result of table 701 with index table 703. Only the first, third and fifth record are present in the result.

A local selection can be performed before the jive-join technique to create a smaller input table to be processed. The join index would thus be built on the smaller input table. Alternatively, a local selection can be performed after the jive-join result in order to locally select the desired records in the entire join result. If the join index already exists, the local selection could be performed on the join index itself, instead of on the input or output tables. The join index is often smaller than the input table and it would take less processing time to locally select the join index. The local selection of the join index would select particular RIDs to be part of the join result. If the join index had not yet been formed, the local selection could also be a part of the formation of the join index. This again would be preferable over processing the input tables themselves because of the smaller size of the index.

An additional way to perform an efficient local selection with the jive-join technique is to check the first-table record against a local condition when the technique reads in records from the first table records. If the local condition is not satisfied, the record will be discarded. One example of a local condition is all student names starting with the letter "K" in a student data group. Another example of a local condition is all offices on the fifth floor or above in a instructor's office data group.

FIG. 8 is a graphical representation of a hybrid join index which can be used with the jive-join technique. In this example, table 801 represents a large input table with many columns (data A contains multiple columns) which is to be joined with tables 803 and 805. Table 805 is also a very large table with many columns (data B contains multiple columns). Table 803 is a smaller table with a second column whose size (in bytes) is relatively small. In this example, table 803 has one column of data that is not present in the other tables.

When the hybrid join index is created, the actual data stored in table 803 will be stored in the second column of join index, rather than its RID value. To create a hybrid join index if one does not already exist, a technique similar to that described with FIG. 5 could be used. Because the data is small in table 803, the join index will not become too large in size to create memory management problems. When a large table 801 or 805 is now processed, the join index column for table 803 will simply be appended to the records of one of those tables. Thus, if the data was appended to table 801, the output file for table 801 would appear as output file 809 which includes the unique data from table 803. Output file 811 would be the vertically fragmented output for table 805.

By using a hybrid join index, I/O operations are saved for processing the data from the input table stored in the join index. The jive-join technique could test the first entries in the join index for their data type or read parameter data stored in a predetermined location to determine if a hybrid join index exists.

Figure 9:
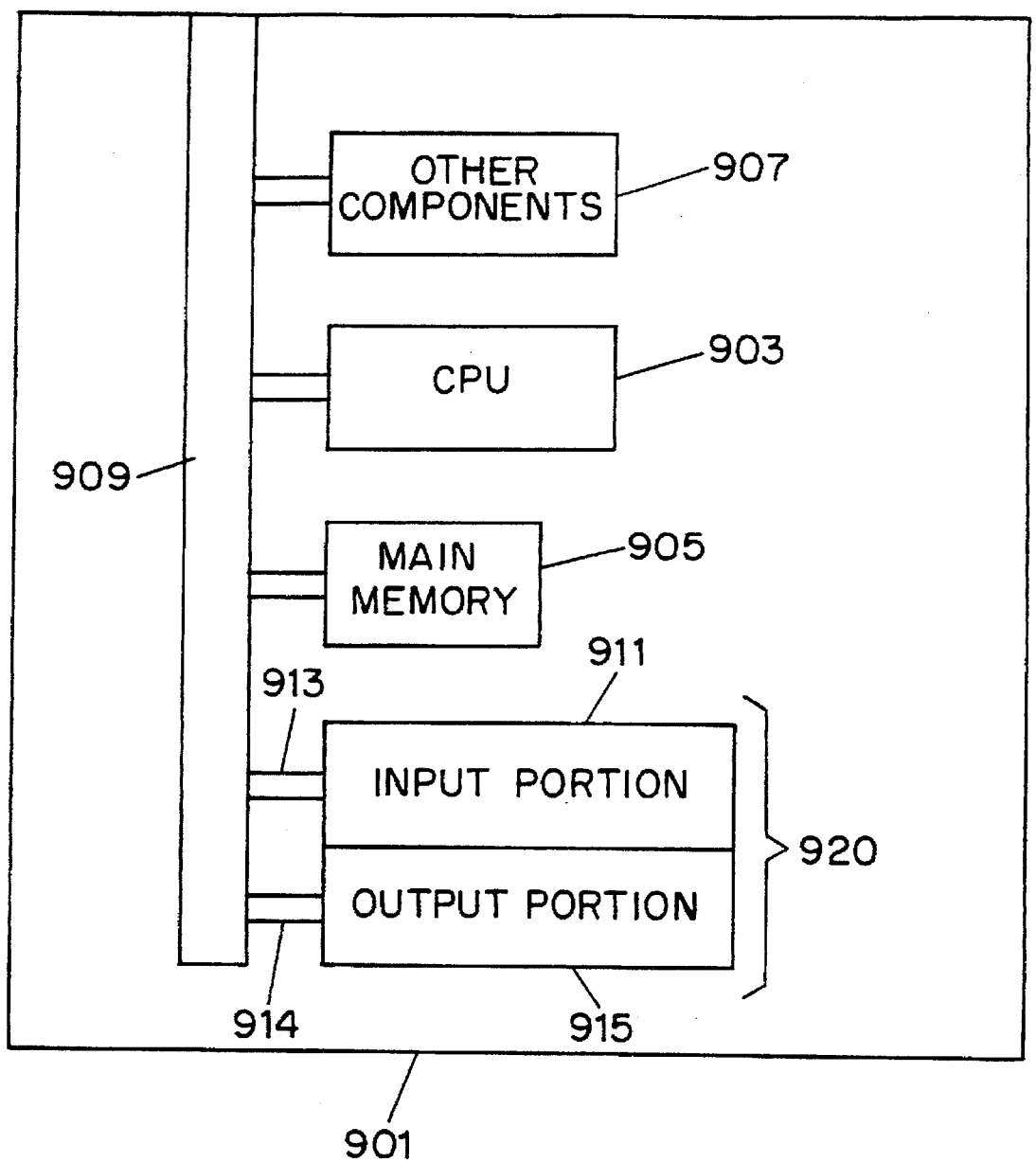
FIG. 9 is a schematic diagram of a computer system upon which the jive-join method can be implemented effectively.

FIG. 9 shows a hardware configuration upon which the jive-join technique can be implemented. Computer 901 includes a central processing unit (CPU) 903, a main memory 905, a mass storage memory system 920, other components 907 necessary to operate computer 901, and a databus 909 which is coupled to each component in the computer to allow data transfer. The databus 909 may be any physical conduit of data and may actually comprise multiple databuses connected together. Main memory 905 could include a RAM or banks of RAM. The CPU 903 executes a stored program routine containing computer instructions to perform the jive-join technique as described in conjunction with FIGS. 1 through 8. Mass storage memory system 920 includes an input memory portion 911 for storing input data and an output memory portion 915 for storing output data. The two portions 911 and 915 can be part of the same physical memory. Alternatively, the two portions could be physically separated and each could be located outside the computer 901 as external storage mediums. Mass storage memory system 920 can comprise multiple storage mediums connected together, such as multiple disks or magnetic tapes, when the amount of input data requires vast storage. Each input table could be stored on separate storage mediums. Mass storage memory system 920 could include any type of storage medium which is capable of storing a large amount of data. Some examples of storage devices which may be used in storage system 920 include magnetic tapes, magnetic disks, optical disks, compact disks, or any other storage medium for large amounts of information. Input memory portion 911 contains at least two input tables to be joined. Connector 913 connects the computer 901 to input memory portion 911. Processor 903 may contain multiple CPUs to further enhance the efficiency of the operation by distributing the processing operation for each of the input tables between the processors.

Output memory portion 915 contains the results of the join operation. Connector 914 couples disk 915 to computer 901 and allows data to be transferred to and from computer 901 to disk 915. Connector 914 may be the same connector as connector 913 which transfers data to and from the input and output memory portions if those portions are interconnected. The output files containing the join results for each individual input tables are stored separately in output memory portion 915. The separate storage locations are due to the vertical fragmentation used by the jive-join technique. Also located in output memory portion 915 are the temporary files which are used in the jive-join technique and contain the join index RIDs for each input table except for the first table being processed. Alternatively, the temporary files could be stored in main memory 905.

Alternatively, multiple computers could be used to process discrete portions of the data such as the records for individual tables. The jive-join technique is easily adaptable to a distributed system. If a computer 601 had multiple users, the available main memory would include only that portion of main memory which was allocated to the particular user performing the jive-join technique.

In order to take maximum advantage of the jive-join technique's "cost" savings, available main memory 915 is preferably smaller than at least one of the input tables stored in input memory portion 911. This configuration will allow the jive-join technique to save many I/O operations over other techniques. Each input table is read in blocks from the input memory portion 911, processed by the CPU 903, and written to the output memory portion 915. Each input table is processed in this way and temporary files are created for each buffer in accordance with the jive-join technique. Temporary files, if stored in the output memory portion 915, are read back from the output memory portion 915 to the CPU 903 in order to sort them and sequentially read the remaining input tables.

The jive-join technique allows each input table to be read only once from the input memory portion 911 for the entire join operation. The selected records from each input table are written only once to the output memory portion 915. This key feature of saving I/O cycles is accomplished by the allocation of the buffers to enable sequential reading of the input tables and the vertical fragmentation which allows each input table to be processed individually. Other techniques discussed in the background section could not reduce the I/O cycles to this low level.

In order to select the optimal number of buffers for a given join operation, the total size of the unique records from each input table (other than the first) that are mentioned in the join index should be compared to the size of the available main memory. The size of the join index indicates the exact size of the join result, one record for each join index entry. However, the same input table record may be indicated multiple times in a join index but only required to be read once. Therefore, the number of buffers is related to the number of unique input table records indicated in the join index. If the number of input table unique records is five times the size of the available main memory (when two tables are joined), then five buffers will be created and a allocation condition will be derived to ensure that each buffer will have an associated output file of substantially equal size after the partitioning operation is done. If more than two tables are joined, the number of buffers will depend on the number of unique join index entries for each table other than the first in the join index. The size of the first table to be joined is not a factor in allocating the buffers. For example, if the selected records from the second table to be joined is four times as large as main memory, and the selected records from the third table is three times as large as main memory, then the product of the two numbers will determine the number of buffers, in this case twelve. In the case of joining three or more tables, a segment, as described above in accordance with FIG. 4, must fit into the main memory rather than a single buffer. In this example, a segment for the second table would contain three buffers while a segment for the third table would contain four buffers. The buffers are created based on the size of available main memory, as some of the memory may be reserved for efficient sorting techniques for representing a portion of the join index or other purposes.

The partitioning values, or conditions as defined above, for each buffer can be defined exactly in order to substantially equally distribute the final join result records between the buffers by reading the join index and determining the conditions based on the RID values in the join index. The relative size of the records can be taken into account. Since the join index lists all the RIDs of the records to be present in the join result, the list of unique RIDs can be apportioned exactly (or at least very close) for all the buffers (or segments). A pre-processing step may be performed to read in the join index and calculate the partitioning conditions in this manner. Alternatively, if the join index must be computed, the partitioning values can be developed at the same time the join index is created. By using the join index as the source for the partitioning values, any skew created by processing the tables can be prevented. If the buffers were simply partitioned on the tables entries evenly without consulting the join index RID values, skew would occur because not every record will be read, but only the selected records that appear in the join index. Some index RID may also appear numerous times on the join index when there are multiple matches.

An alternative way to determine the conditions is to sample a portion of the join index. Given that the input tables are very large for optimal use, the sample would only need to be a small portion of the entire table to statistically calculate an allocation that is close to the optimal. Sampling the join index would save both I/O and processing operations.

The jive-join technique does have some memory size requirements in order to achieve optimal performance during operation. Optimal operation of jive-join does require a particular size of main memory for a given size of input tables to be processed. The requirement is due to the fact that a buffer or segment (made of multiple buffers) must fit into main memory all at once for processing. The required main memory can be derived with the following equations: The first two steps of the technique, that of memory allocation and processing the first table which must fit into main memory yields the equation:

$$y*(x+((r-1)*v)) \leq m$$

where y=the number of disk buffers; x=length of an output-file sequence in a disk buffer; r=number of tables to be joined; v=length of temporary file sequence in a disk buffer; and m=size of main memory (in blocks). An additional size constraint occurs in the third step in the technique (of sorting and reading in the remaining tables) which requires the step to occur in main memory. This constraint yields the equation:

$$(s+1)*z+(T_i*R_i) \leq K_i*m$$

where s=multiple of size of table required for in-memory sorting; z=size of temporary table (being processed); $T_i$=the proportion of the records in table i that participate in the join (proportion of selected records); $R_i$=the number of blocks in table i; $K_i$=number of segments for $i^{th}$ table; m=size of main memory.

Combining the above two memory constraints, and assuming all records participate in the join and all the tables are equal in size, the equations can be reduced to $$R_i \leq m * {}^{r-1}\sqrt{m/r} \text{ for } i=2,\ldots,r$$

This equation produces the following chart of the maximum size for multiple input tables of the same size to be joined when main memory is 128 MB and disk block size equals 8 KB:

| # of input tables | Size of R2, R3, ... $R_n$ |
| --- | --- |
| 2 | 1,050,000 MB |
| 3 | 9,570 MB |
| 4 | 2,080 MB |
| 5 | 658 MB |
| 6 | 477 MB |
| 10 | 291 MB |
| 50 | 144 MB |

The table exhibits that the input tables can be very large compared to the size of the main memory. 128 MB is a typical size of RAM in a work-station. Larger input tables can be processed if the size of main memory increases. Smaller amounts of RAM can used to process smaller input tables. Since only selected records are read from each input table, the total size of the input table can be even greater since only the selected records will be read and processed.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

I claim:

1. A method for joining a plurality of input tables comprised of records stored in a first memory in a database system which includes said first memory and a relatively high speed second memory having a storage capacity smaller than necessary to store at least one of said input tables, said method using a join index indicative of records to be joined and having an index entry for each record to be included in an output resulting from said join, and comprising the steps of:
   (a) allocating an array of buffers in said second memory;
   (b) reading a first table from said plurality of tables only once during said joining;
   (c) separately processing said plurality of input tables other than said first table by reading said input tables into said second memory only once during said joining; and
   (d) writing join results for each one of said input tables into separate output files only once during said joining.

2. The method of claim 1, wherein said reading a first table step further includes storing said read records of said first table in said buffers of said second memory in accordance with said allocation.

3. The method of claim 2, wherein said allocation step substantially equally distributes said records of said input tables other than said first table among said array of buffers.

4. The method of claim 3, wherein said allocations steps includes reading said join index to determine said allocation.

5. The method of claim 1 further comprising the step of generating the join index.

6. The method of claim 1, wherein said separate output files are connected by file pointers.

7. The method of claim 1, wherein said join index further includes additional records which are included in said output file of one of said input tables.

8. A method for joining in a database system a plurality of input tables comprised of records stored in a first memory using a join index indicative of records to be joined and having an index entry for each record to be included an output resulting from said join, said method comprising the steps of:

(a) allocating an array of buffers in a second, relatively fast access memory;
(b) reading said join index;
(c) sequentially reading each of said records of a first input table from said input tables only if said record is identified in said join index;
(d) storing any of said read records read from said first input table to one of said buffers in accordance with said allocation;
(e) storing said join index entries corresponding to each of said tables other than said first table to temporary files associated with corresponding ones of said allocated buffers;
(f) reading in turn said index entries in each of said temporary file and sorting each said temporary file;
(g) sequentially reading portions of said tables other than said first input table only if said portion includes a record identified in said sorted temporary file;
(h) writing said records in said second memory in accordance with an order of join index entries maintained in said associated temporary files to separate output files associated with each said input table.

9. The method of claim 8, wherein said allocation step substantially equally distributes said records of said input tables other than said first table among said array of buffers.

10. The method of claim 9, wherein said allocations steps includes reading said join index to determine the allocation.

11. The method of claim 8, wherein an optimal number of buffers is determined for said array of buffers.

12. The method of claim 8, wherein each of said input tables are read only once.

13. The method of claim 8, further comprising the step of generating the join index.

14. The method of claim 8, wherein at least one of said input tables is larger than said second memory.

15. The method of claim 8, wherein steps b and c are performed concurrently.

16. The method of claim 8, wherein said records are read as part of data blocks.

17. The method of claim 8, further including the step of locally selecting at least one of the input and output files.

18. The method of claim 8, further including the step of locally selecting said join index.

19. The method of claim 8, wherein said join index further includes additional records which are included in said output files of at least one of said input tables.

20. The method of claim 8, wherein said sorting step includes sorting a plurality of temporary files together.

21. The method of claim 8, further including the step of writing said read records from said first input table to said separate output files associated with said first input table.

22. The method of claim 8, wherein said separate output files are connected by file pointers.

23. A method for joining in a database system a plurality of input tables comprised of records and record identifiers in a first memory, comprising the steps of:
   (a) allocating an array of buffers in a second relatively fast access memory;
   (b) sequentially reading said records of one of said tables;
   (c) storing said records from said one of said tables to one of said buffers in accordance with said allocation;
   (d) storing said record identifiers corresponding to each of said other tables to temporary files, wherein each of said temporary file is associated with one of said allocated buffers;

(e) reading in turn said record identifiers in each of said temporary files and sorting each said temporary file;

(f) sequentially reading portions of each of said other tables only if said portion includes a record identified by said sorted temporary file;

(g) writing said records in said second memory in accordance with an order of record identifiers maintained in said associated temporary file into separate output files associated with each said input table.

24. The method of claim 23, wherein said database system is an object-oriented database system.

25. The method of claim 23, wherein said allocation step substantially equally distributes said records of said input tables other than said first table among said array of buffers.

26. The method of claim 23, wherein at least one of said input tables is larger than said second memory.

27. The method of claim 23, further including the step of locally selecting at least one of the input and output files.

28. The method of claim 23, further including the step of testing records from at least one input table to determine if said records satisfy a local condition.

29. The method of claim 23, wherein said sorting step includes sorting a plurality of temporary files together.

30. The method of claim 23, further including the step of writing said read records from said first input table to separate output files associated with the first input table.

31. The method of claim 23, wherein said separate output files are connected by file pointers.

32. An apparatus for joining a plurality of input tables comprised of records in a database system using a join index indicative of records to be joined and having an index entry for each record to be included in an output resulting from said join, said apparatus comprising:

(a) a program routine for allocating an array of buffers in a memory;

(b) means for reading said join index and for sequentially reading said input tables only once;

(c) means for processing said input tables using said allocated array of buffers; and (d) means for writing said records only once to separate output files associated with each said input table.

33. A database system capable of performing join operations on a plurality of input tables using a join index, comprising:

(a) a central processing unit;

(b) a main memory partitionable into a plurality of partitions;

(c) a storage medium separate from said main memory;

(d) a plurality of input tables stored in said storage medium;

(e) a join index stored in said storage medium indicating corresponding entries of said tables to be joined;

(f) a plurality of output files, wherein each one of said output files corresponds to only one of said tables;

(g) wherein said processing unit processes said join operation by only reading each of said input tables once from said storage medium, processing said input tables in said main memory using said partitions and writing said join operation's results for each said input table only once to said corresponding output files.

34. The system in claim 33, wherein said main memory's storage capacity is smaller than at least one of said input tables stored in said storage medium.

35. The system in claim 33, wherein said join index is generated by said central processing unit prior to said join operation.

* * * * *

UNITED STATES PATENT AND TRADEMARK OFFICE
CERTIFICATE OF CORRECTION

PATENT NO. : 5,666,525

DATED : September 9, 1997

INVENTOR(S) : Ross

It is certified that error appears in the above-identified patent and that said Letters Patent is hereby corrected as shown below:

ON THE TITLE PAGE:

Title pg. Item 56, line 5, "Daal" should read --Dalal--;

Col. 1, line 26, "wants" should read --want--;

Col. 11, line 3, "237, 237" should read --237, 239--;

Col. 18, line 45, "Which" should read --which--;

Col. 20, line 60, "tables" should read --table--;

Col. 23, line 53 "allocations steps" should read --allocation step--;

Col. 23, line 65, "included an" should read --included in an--;

Col. 24, line 16, "file" (first occurrence) should read --files--;

Col. 24, line 28, "steps" should read --step--; and

Col. 24, line 66, "file" should read --files--.

Signed and Sealed this

Fourteenth Day of April, 1998

Attest:

*Attesting Officer*

BRUCE LEHMAN

*Commissioner of Patents and Trademarks*